(12) United States Patent
Takenaka et al.

(10) Patent No.: US 12,337,907 B2
(45) Date of Patent: Jun. 24, 2025

(54) VALVE SYSTEM, WORK MACHINE, METHOD FOR CONTROLLING VALVE, PROGRAM, AND RECORDING MEDIUM

(71) Applicant: KOMATSU LTD., Tokyo (JP)

(72) Inventors: Yuita Takenaka, Tokyo (JP); Yuichi Teranishi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 772 days.

(21) Appl. No.: 17/628,278

(22) PCT Filed: Sep. 14, 2020

(86) PCT No.: PCT/JP2020/034792
§ 371 (c)(1),
(2) Date: Jan. 19, 2022

(87) PCT Pub. No.: WO2021/065455
PCT Pub. Date: Apr. 8, 2021

(65) Prior Publication Data
US 2022/0266898 A1    Aug. 25, 2022

(30) Foreign Application Priority Data

Sep. 30, 2019  (JP) ................................. 2019-180490

(51) Int. Cl.
*B62D 5/09* (2006.01)
*B62D 12/00* (2006.01)
*B62D 6/02* (2006.01)

(52) U.S. Cl.
CPC ............. *B62D 5/091* (2013.01); *B62D 12/00* (2013.01); *B62D 6/02* (2013.01)

(58) Field of Classification Search
CPC ........ B62D 5/09; B62D 5/091; B62D 5/0835; B62D 12/00; B62D 6/02; B62D 1/14
(Continued)

(56) References Cited

U.S. PATENT DOCUMENTS

| 9,248,854 B2 * | 2/2016 | Belshan .................. B62D 5/32 |
| 2009/0084103 A1 * | 4/2009 | Budde .................. E02F 9/0841 |
| | | 60/459 |

(Continued)

FOREIGN PATENT DOCUMENTS

| JP | 2006-335094 A | 12/2006 |
| JP | 2015-123835 A | 7/2015 |

(Continued)

OTHER PUBLICATIONS

The extended European search report for the corresponding European application No. 20870693.7, issued on Jun. 13, 2023.

(Continued)

*Primary Examiner* — Christopher B Wehrly
(74) *Attorney, Agent, or Firm* — Global IP Counselors, LLP

(57) ABSTRACT

A valve system includes a valve configured to adjust a flow rate of hydraulic fluid in order to steer a work machine, and a control section configured to determine a command signal sent to the valve. The command signal determines a command flow rate of the hydraulic fluid based on a target flow rate corresponding to an input operation command and a change amount in the target flow rate. The control section is configured to control the change amount according to a magnitude of a reversal operation command when receiving the reversal operation command in order to operate the work machine in a direction opposite to a direction in which steering is operating. A work machine includes the valve system, a front frame, a rear frame, an articulate mechanism rotatably connecting the front frame to the rear frame, and a hydraulic actuator.

15 Claims, 15 Drawing Sheets

(58) Field of Classification Search
USPC .......................................................... 180/441
See application file for complete search history.

(56) References Cited

U.S. PATENT DOCUMENTS

| | | | |
|---|---|---|---|
| 2009/0166124 A1* | 7/2009 | Bauer | B63H 25/02 |
| | | | 701/41 |
| 2011/0010055 A1* | 1/2011 | Wahlstrom | B62D 1/22 |
| | | | 701/42 |
| 2018/0105205 A1* | 4/2018 | Takenaka | B62D 6/02 |
| 2019/0017245 A1* | 1/2019 | Takenaka | B62D 5/28 |
| 2021/0222401 A1* | 7/2021 | Imaizumi | E02F 3/431 |

FOREIGN PATENT DOCUMENTS

| | | |
|---|---|---|
| WO | 2017/073617 A1 | 5/2017 |
| WO | 2017/209055 A1 | 12/2017 |
| WO | 2018/199342 A1 | 11/2018 |

OTHER PUBLICATIONS

The International Search Report for the corresponding international application No. PCT/JP2020/034792, issued on Dec. 1, 2020.
The Office Action for the corresponding Japanese divisional application No. 2023-135505, issued on Mar. 12, 2024.

\* cited by examiner

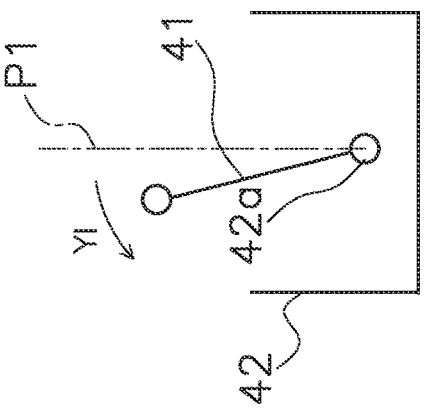 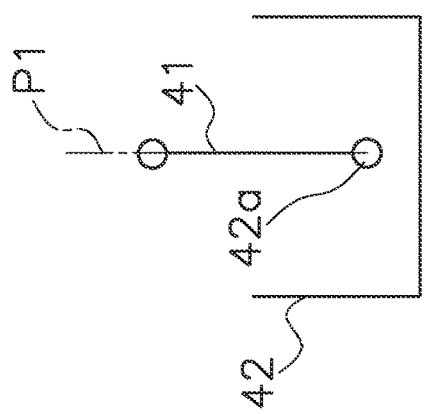 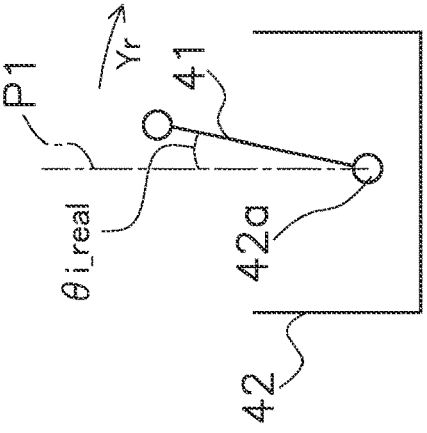
FIG. 8A   FIG. 8B   FIG. 8C
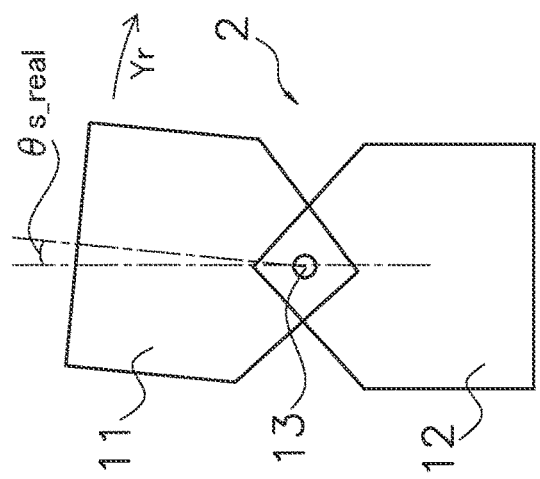 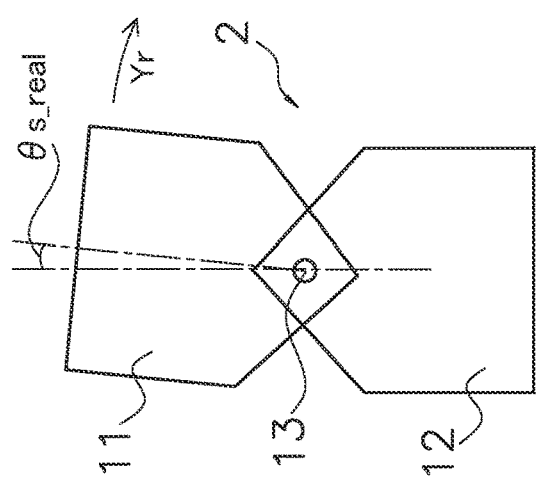 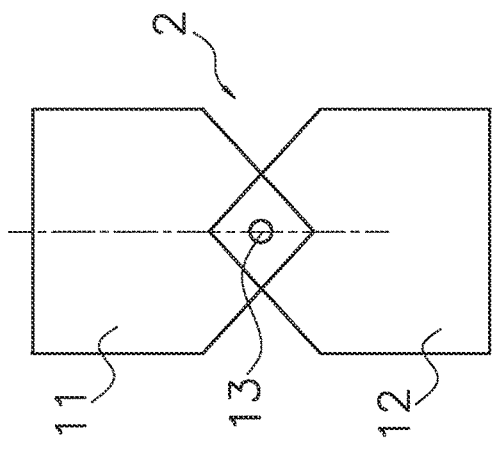

VALVE SYSTEM, WORK MACHINE, METHOD FOR CONTROLLING VALVE, PROGRAM, AND RECORDING MEDIUM

CROSS-REFERENCE TO RELATED APPLICATIONS

This application is a U.S. National stage application of International Application No. PCT/JP2020/034792, filed on Sep. 14, 2020. This U.S. National stage application claims priority under 35 U.S.C. § 119(a) to Japanese Patent Application No. 2019-180490, filed in Japan on Sep. 30, 2019, the entire contents of which are hereby incorporated herein by reference.

BACKGROUND

Field of Invention

The present invention relates to a valve system, a work machine, a method for controlling a valve, a program, and a recording medium.

Background Information

As an articulate-type work machine, a configuration is disclosed in which the steering angle is changed by controlling the flow rate of hydraulic fluid supplied to a hydraulic actuator arranged over a front frame and a rear frame (for example, see a U.S. Pat. No. 9,248,854).

The work machine shown in U.S. Pat. No. 9,248,854 is provided with a steering valve that adjusts the flow rate of hydraulic fluid supplied to the hydraulic actuator according to the input pilot pressure, and a pilot valve that adjusts the pilot pressure supplied to the steering valve.

By operating the joystick lever by the operator, for example, the opening degree of the pilot valve is adjusted and the pilot pressure input to the steering valve is adjusted. The flow rate of oil supplied from the steering valve to the hydraulic actuator is changed according to the adjusted pilot pressure, and the steering angle is changed.

SUMMARY

However, when the reversal operation is performed to operate the joystick lever in the opposite direction beyond the neutral position while the front frame is rotating in one direction of the left and the right, the input/output of hydraulic fluid to the steering cylinder suddenly stops in the neutral position. For this reason, the front frame having a large weight suddenly stops, and the vehicle body vibrates greatly.

It is an object of the present disclosure to provide a valve system, a work machine, a method for controlling a valve, and a program that enable control according to an operation command while suppressing vibration during the reversal operation.

The valve system according to this aspect includes a valve and a control section. The valve adjusts a flow rate of hydraulic fluid for steering the work machine. The control section determines a command signal to the valve determining a command flow rate of the hydraulic fluid based on a target flow rate corresponding to an input operation command and a change amount in the target flow rate. When the control section receives a reversal operation command for operating the work machine in a direction opposite to a direction in which the steering is operating, the control section controls a change amount according to magnitude of the reversal operation command.

The method for controlling valve according to this aspect is a method for controlling a valve to adjust a flow rate of hydraulic fluid for steering a work machine, and includes a determination step, a transmission step, and a control step. The determination step determines a command signal to the valve determining a command flow rate of the hydraulic fluid based on a target flow rate corresponding to an input operation command and a change amount in the target flow rate. The transmission step transmits the command signal to the valve. When a reversal operation command for operating the work machine in a direction opposite to a direction in which the steering is operating is received, the control step controls a change amount according to magnitude of the reversal operation command.

The program according to this aspect is a program for causing a computer to execute a determination step, a transmission step, and a control step of a method for controlling a valve to adjust a flow rate of hydraulic fluid for steering a work machine. The determination step determines a command signal to the valve determining a command flow rate of the hydraulic fluid based on a target flow rate corresponding to an input operation command and a change amount in the target flow rate. The transmission step transmits the command signal to the valve. When a reversal operation command for operating the work machine in a direction opposite to a direction in which the steering is operating is received, the control step controls a change amount according to magnitude of the reversal operation command.

The recording medium according to this aspect is a recording medium which records a program for causing a computer to execute a determination step, a transmission step, and a control step of a method for controlling a valve to adjust a flow rate of hydraulic fluid for steering a work machine and is which can be read by a computer. The determination step determines a command signal to the valve determining a command flow rate of the hydraulic fluid based on a target flow rate corresponding to an input operation command and a change amount in the target flow rate. The transmission step transmits the command signal to the valve. When a reversal operation command for operating the work machine in a direction opposite to a direction in which the steering is operating is received, the control step controls a change amount according to magnitude of the reversal operation command.

According to the present disclosure, it is possible to provide a valve system, a work machine, a method for controlling a valve, and a program that enable control according to an operation command while suppressing vibration during the reversal operation.

BRIEF DESCRIPTION OF THE DRAWINGS

FIG. 8A, FIG. 8B and FIG. 8C are schematic views for explaining a reversal operation.

DETAILED DESCRIPTION OF EMBODIMENT(S)

A wheel loader as an example of the work machine according to the present disclosure will be described below with reference to the drawings.

Embodiment 1

The wheel loader 1 of the first embodiment according to the present invention will be described below.
Configuration
(Overview of Wheel Loader Configuration)

Figure 1:
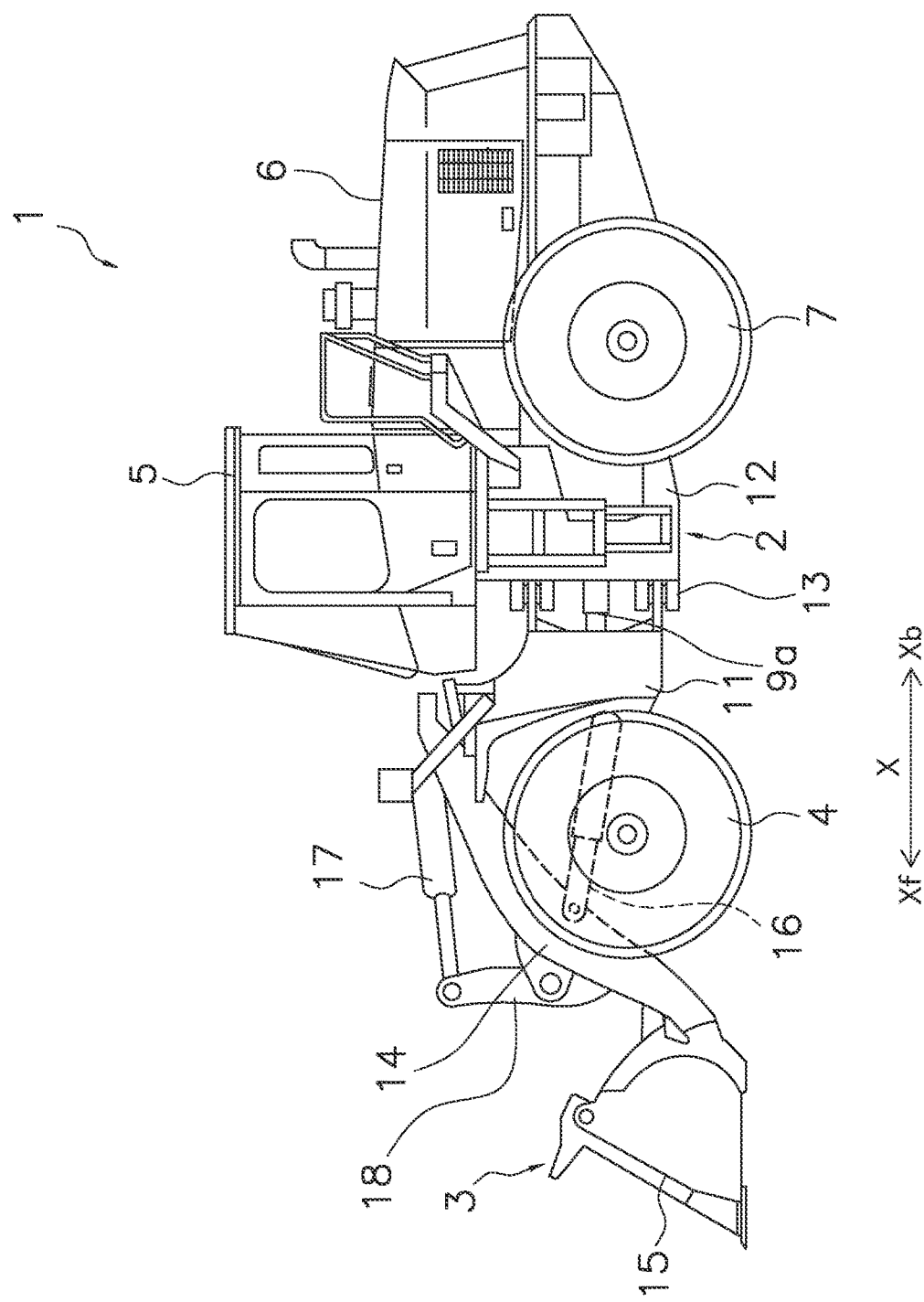
FIG. 1 is a side view showing a wheel loader in a first embodiment according to the present disclosure.

FIG. 1 is a schematic view showing a configuration of the wheel loader 1 of the present embodiment. The wheel loader 1 of the present embodiment includes a vehicle body frame 2, a work implement 3, a pair of front tires 4, a cab 5, an engine room 6, a pair of rear tires 7, a valve system 8 (see FIG. 3), and a steering cylinder 9a. 9b (an example of a hydraulic actuator) (see FIG. 3).

In the following description, "front", "rear", "right", "left", "top", and "bottom" indicate directions based on the state of looking forward from the driver's seat. In addition, "vehicle width direction" and "left-right direction" are synonymous. In FIG. 1, the front-rear direction is indicated by X, the front direction is indicated by Xf, and the rear direction is indicated by Xb. Further, in the drawings described later, the left-right direction is indicated by Y, the right direction is indicated by Yr, and the left direction is indicated by Yl.

The wheel loader 1 uses the work implement 3 to perform earth and sand loading work and the like.

The vehicle body frame 2 is a so-called articulate type, and includes a front frame 11, a rear frame 12, and a connecting shaft part 13 (an example of an articulate mechanism). The front frame 11 is arranged in front of the rear frame 12. The connecting shaft part 13 is provided at the center in the vehicle width direction, and connects the front frame 11 and the rear frame 12 so as to be swingable to each other. The pair of front tires 4 are attached to the left and right sides of the front frame 11. Further, a pair of rear tires 7 are attached to the left and right sides of the rear frame 12.

The work implement 3 is driven by hydraulic fluid from a work implement pump (not shown). The work implement 3 includes a boom 14, a bucket 15, a lift cylinder 16, and a bucket cylinder 17. The boom 14 is attached to the front frame 11. The bucket 15 is attached to the tip of the boom 14.

The lift cylinder 16 and the bucket cylinder 17 are hydraulic cylinders. One end of the lift cylinder 16 is attached to the front frame 11, and the other end of the lift cylinder 16 is attached to the boom 14. The boom 14 swings up and down due to the expansion and contraction of the lift cylinder 16. One end of the bucket cylinder 17 is attached to the front frame 11, and the other end of the bucket cylinder 17 is attached to the bucket 15 via the bell crank 18. The bucket 15 swings up and down due to the expansion and contraction of the bucket cylinder 17.

The cab 5 is mounted on the rear frame 12, and a joystick lever 41 for steering operation (an example of an operating member) (see FIG. 2 described later), a lever for operating the work implement 3 and various display devices, etc. are arranged inside. The engine room 6 is located on the rear side of the cab 5 and on the rear frame 12, and houses the engine.

Figure 2:
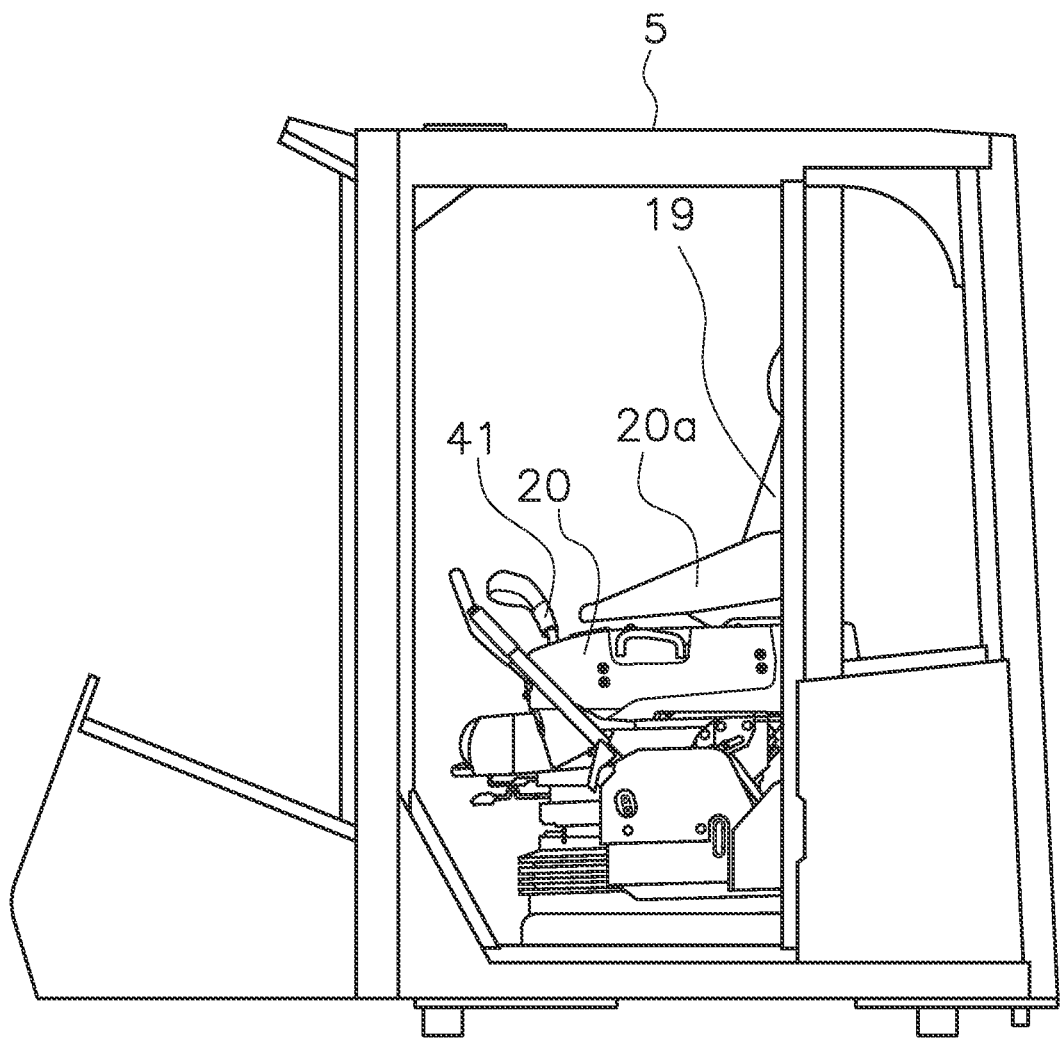
FIG. 2 is a side view showing a vicinity of a cab in FIG. 1.

FIG. 2 is a partial side view of the cab 5. The driver's seat 19 is provided in the cab 5, and the console box 20 is arranged on the side of the driver's seat. An armrest 20a is arranged on the upper side of the console box 20. The joystick lever 41 is arranged upward from the front tip part of the console box 20.

Figure 3:
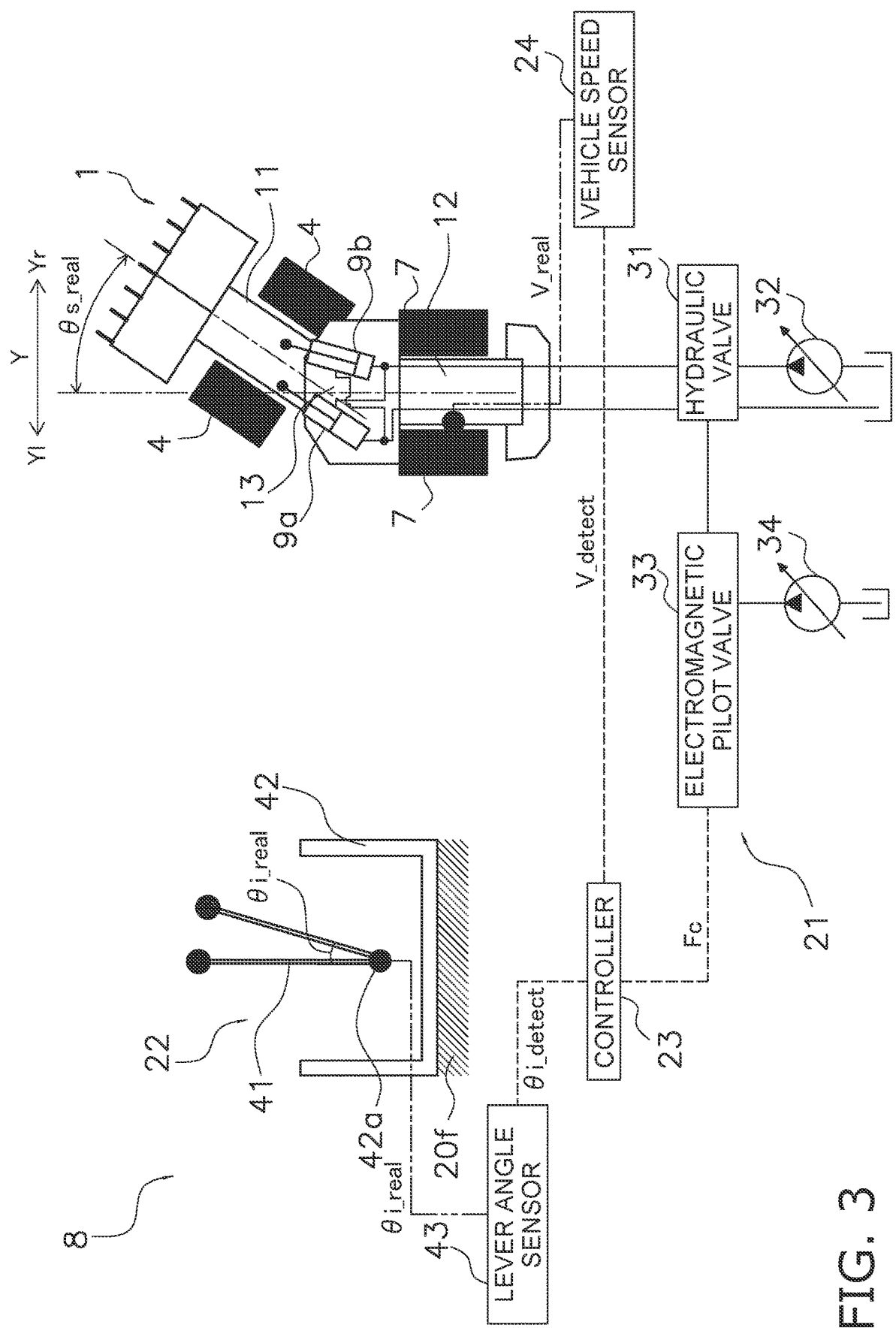
FIG. 3 is a configuration diagram showing a valve system in FIG. 1.

FIG. 3 is a configuration diagram showing a valve system 8. The valve system 8 changes the vehicle body frame angle of the front frame 11 with respect to the rear frame 12 by changing the flow rate of the hydraulic fluid supplied to the steering cylinders 9a and 9b, and changes the traveling direction of the wheel loader 1.

The pair of steering cylinders 9a and 9b are hydraulically driven. The pair of steering cylinders 9a and 9b are arranged side by side on the left and right sides in the vehicle width direction so as to sandwich the connecting shaft part 13. The steering cylinder 9a is arranged on the left side of the connecting shaft part 13. The steering cylinder 9b is arranged on the right side of the connecting shaft part 13. One end of each of the steering cylinders 9a and 9b is attached to the front frame 11, and the other end of each is attached to the rear frame 12.

When the steering cylinder 9a expands and the steering cylinder 9b contracts due to the hydraulic pressure from the valve system 8, an actual vehicle body frame angle θ s_real changes and the vehicle turns to the right. Further, when the steering cylinder 9a contracts and the steering cylinder 9b expands due to the hydraulic pressure from the valve system 8 and, the actual vehicle body frame angle θ s_real changes and the vehicle turns to the left. In the present embodiment, the actual vehicle body frame angle θ s_real when the front frame 11 and the rear frame 12 are arranged along the front-rear direction is set to zero, the right side is a positive value, and the left side is a negative value.
(Valve System 8)

The valve system 8 includes a hydraulic circuit 21, a lever unit 22, a controller 23 (an example of a control section), and a vehicle speed sensor 24.

The hydraulic circuit 21 adjusts the drive outputs of the steering cylinders 9a and 9b. The lever unit 22 includes a joystick lever 41 and the like, and a target flow rate of the hydraulic valve 31 is input by the operator. The target flow rate Ft is a target value of the flow rate of the hydraulic fluid supplied from the hydraulic valve 31 to the steering cylinders 9a and 9b.

The controller 23 instructs the hydraulic circuit 21 to adjust the drive outputs of the steering cylinders 9a and 9b based on the target flow rate input to the lever unit 22. The vehicle speed sensor 24 detects the vehicle speed V of the wheel loader 1 and transmits it as a detection signal V_detect to the controller 23.

In FIG. 3, the transmission of signals based on electricity is shown by a dotted line, and the transmission based on hydraulic pressure is shown by a solid line. The detection by the sensor is indicated by the alternate long and two short dashes line.

(Hydraulic Circuit 21)

The hydraulic circuit 21 adjusts the flow rate of the hydraulic fluid supplied to the steering cylinders 9a and 9b. The hydraulic circuit 21 includes a hydraulic valve 31, a main pump 32, an electromagnetic pilot valve 33 (an example of a valve), and a pilot pump 34.

The hydraulic valve 31 is a flow rate adjusting valve that adjusts the flow rate of the hydraulic fluid supplied to the steering cylinders 9a and 9b according to the input pilot pressure. As the hydraulic valve 31, for example, a spool valve is used. The main pump 32 supplies the hydraulic fluid for operating the steering cylinders 9a and 9b to the hydraulic valve 31.

The hydraulic valve 31 includes a valve body (not shown, for example, a spool) that can be moved to a left steering position, a neutral position, and a right steering position. When the valve body is arranged at the left steering position in the hydraulic valve 31, the steering cylinder 9a contracts, the steering cylinder 9b expands, the actual vehicle body frame angle θ s_real becomes small, and the vehicle body turns to the left.

When the valve body is arranged at the right steering position in the hydraulic valve 31, the steering cylinder 9b contracts, the steering cylinder 9a expands, the actual vehicle body frame angle θ s_real increases, and the vehicle body turns to the right. When the valve body is arranged at the neutral position P1 in the hydraulic valve 31, the actual vehicle body frame angle θ s_real does not change.

The electromagnetic pilot valve 33 is a flow rate adjusting valve that adjusts the flow rate or the pressure of the pilot hydraulic pressure supplied to the hydraulic valve 31 in response to a command from the controller 23. The pilot pump 34 supplies the hydraulic fluid for operating the hydraulic valve 31 to the electromagnetic pilot valve 33. The electromagnetic pilot valve 33 is, for example, a spool valve or the like, and is controlled according to a command from the controller 23.

The electromagnetic pilot valve 33 includes a valve body (not shown, for example, a spool) that can be moved to a left pilot position, a neutral position P1, and a right pilot position. When the valve body of the electromagnetic pilot valve 33 is arranged at the left pilot position, the hydraulic valve 31 takes the state of the left steering position. When the valve body of the electromagnetic pilot valve 33 is arranged at the right pilot position, the hydraulic valve 31 takes the state of the right steering position. When the valve body of the electromagnetic pilot valve 33 is arranged at the neutral position P1, the hydraulic valve 31 takes the state of the neutral position P1. The neutral position P1 corresponds to an example of a first predetermined threshold value and a second predetermined threshold value.

By controlling the pilot hydraulic pressure or the pilot flow rate from the electromagnetic pilot valve 33 according to the command flow rate Fc from the controller 23, the hydraulic valve 31 is controlled and the steering cylinders 9a and 9b are controlled. The command flow rate Fc is a command value of the flow rate of the hydraulic fluid supplied from the hydraulic valve 31 to the steering cylinders 9a and 9b.

By operating the joystick lever 41, as the valve body of the electromagnetic pilot valve 33 moves from the neutral position P1 to the right pilot position, the flow rate for moving the valve body of the hydraulic valve 31 to the right steering position increases, and the flow rate for moving the steering to the right is 100% at the right pilot position. Further, by operating the joystick lever 41, as the valve body of the electromagnetic pilot valve 33 moves from the neutral position P1 to the left pilot position, the flow rate for moving the valve body of the hydraulic valve 31 to the left steering position increases, and the flow rate for moving the steering to the left is 100% at the left pilot position. The flow rate for moving the steering to the right is indicated by a positive value, and the flow rate for moving the steering to the left is indicated by a negative value.

(Lever Unit 22)

As shown in FIG. 3, the lever unit 22 includes a joystick lever 41, a support part 42, and a lever angle sensor 43.

The support part 42 is fixed to the frame 20f of the console box 20. The support part 42 may be a part of the frame of the console box 20.

The joystick lever 41 is rotatably arranged with respect to the support part 42. The joystick lever 41 is configured to be rotatable with respect to the support part 42 by forming a through hole at the base end portion thereof and inserting the shaft 42a into the through hole, for example.

When the joystick lever 41 is in the central position, the valve body of the electromagnetic pilot valve 33 is arranged in the neutral position P1. When the joystick lever 41 is moved from the center position to the right, the valve body of the electromagnetic pilot valve 33 is moved to the right pilot position side, and when the joystick lever 41 is moved from the center position to the left, the valve body of the electromagnetic pilot valve 33 is moved to the left pilot position side.

When the joystick lever 41 is moved from the center position by the operation angle θ i_real, the operation angle is detected by the lever angle sensor 43 and output to the controller 23 as the detection angle θ i_detect (an example of the operation command).

(Controller 23)

The controller 23 includes a processor such as a CPU (Central Processing Unit), and a storage and a main memory including a non-volatile memory such as ROM (Read Only Memory) and a volatile memory such as RAM (Random Access Memory). The controller 23 reads a program stored in the storage, which is an example of the recording medium, expands the program in the main memory, and executes a predetermined process according to the program. The program may be distributed to each controller via the network.

Figure 4:
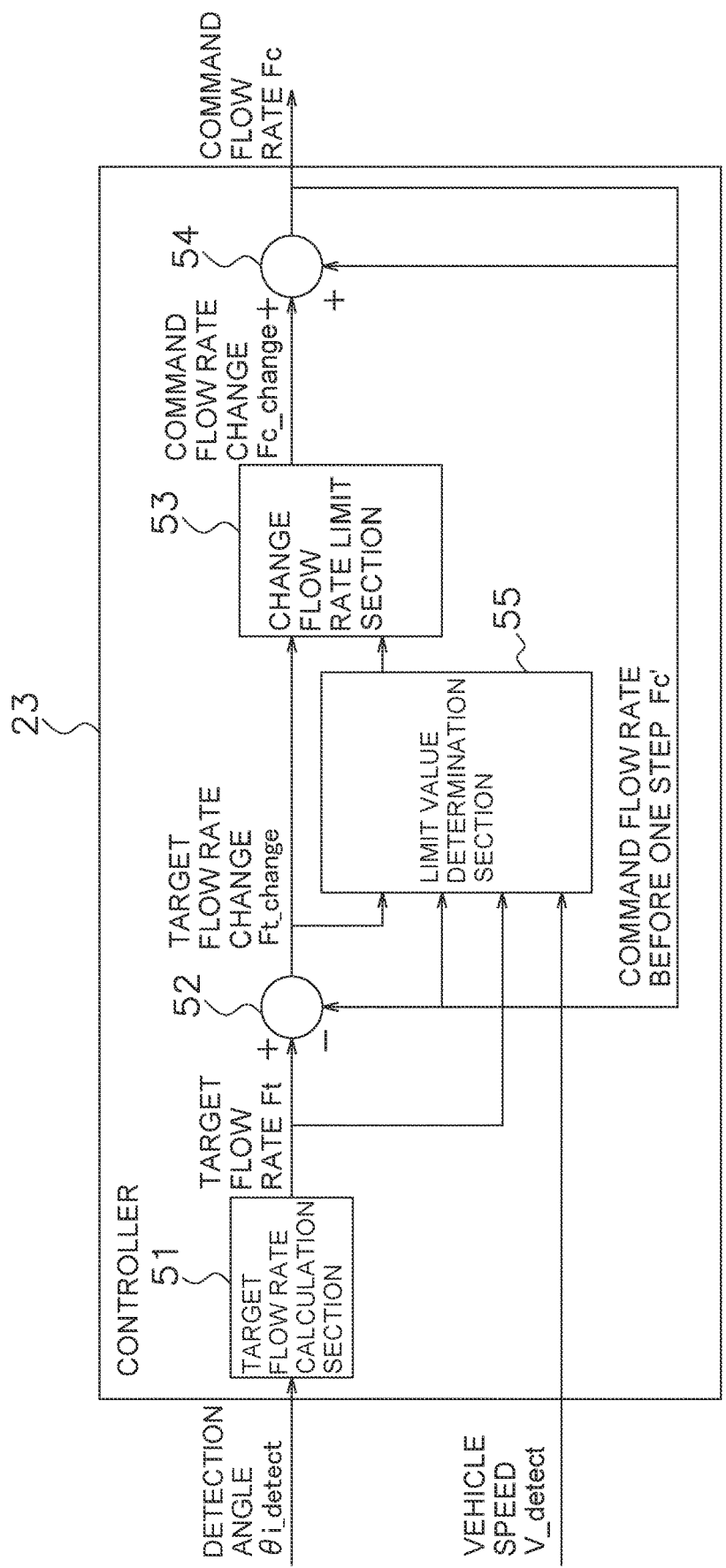
FIG. 4 is a block diagram showing a configuration of a controller in FIG. 3.

FIG. 4 is a block diagram showing the configuration of the controller 23.

The controller 23 includes a target flow rate calculation section 51, a first calculation section 52, a change flow rate limit section 53, a second calculation section 54, and a limit value determination section 55.

Figure 5A:
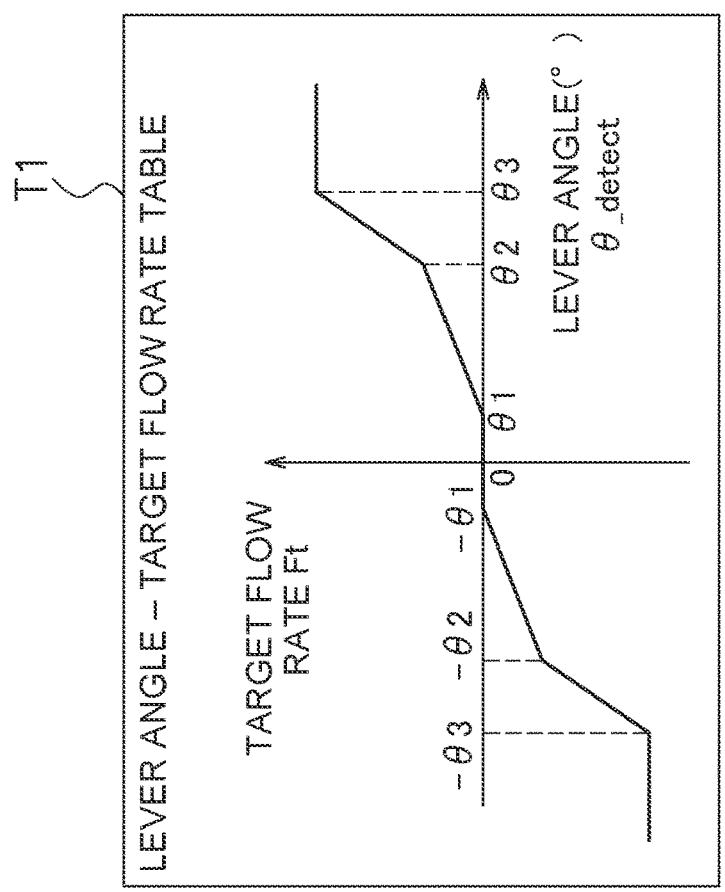
FIG. 5A is a diagram showing a lever angle-target flow rate table.

Here, the target flow rate calculation section 51 determines the target flow rate Ft of the hydraulic fluid, which is discharged from the hydraulic valve 31, from the detection angle θ i_detect detected by the lever angle sensor 43 using the lever angle-target flow rate table T1 stored in advance. FIG. 5A is a diagram showing a lever angle-target flow rate table T1. The lever angle-target flow rate table T1 is a table in which a target flow rate is determined with respect to the lever angle. In the lever angle-target flow rate table T1 shown in FIG. 5A, a target flow rate is set for the lever angle θ i_detect. As the lever angle θ i_detect increases from the predetermined angle θ 1 to the predetermined angle θ 2, the target flow rate also increases with a constant inclination. As the lever angle θ i_detect increases from the predetermined angle θ 2 to the predetermined angle θ 3, the target flow rate also increases with a steeper inclination than the angles θ 1 to θ 2. From the angle θ 3, the target flow rate is constant even when the angle increases. In FIG. 5A, the angle change and the flow rate change of the joystick lever 41 from the neutral position P1 to one direction (for example, the right direction) are shown by positive values, and the angle change and the flow rate change of the joystick lever 41 in the opposite direction are shown by negative values.

The first calculation section 52 subtracts the command flow rate Fc one step before from the target flow rate Ft, and calculates the change amount Ft_change of the target flow rate.

Figure 5B:
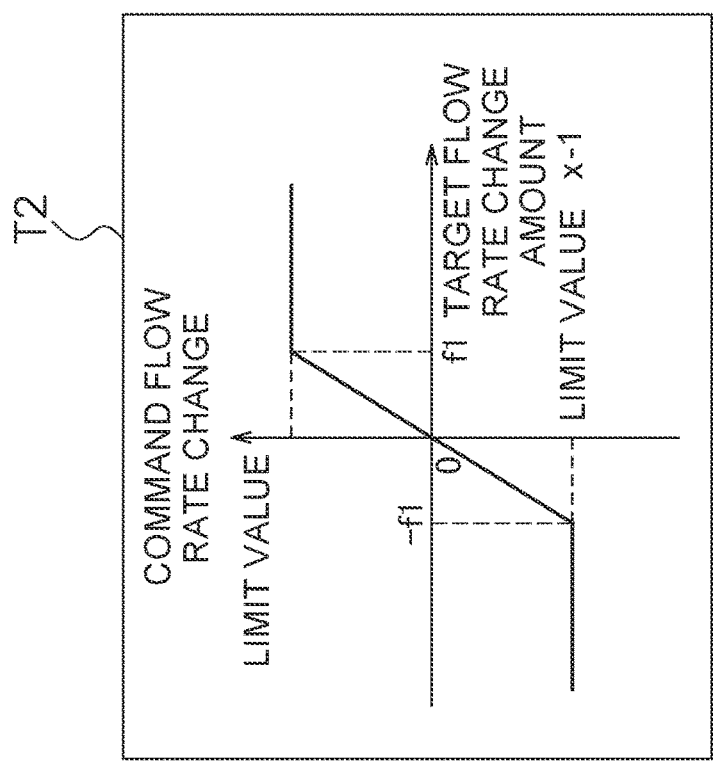
FIG. 5B is a diagram showing a table of a limit value of a change amount in a command flow rate with respect to a change amount of a target flow rate.

The change flow rate limit section 53 obtains a limit value of the change amount Fc_change of the command flow rate Fc from the target flow rate change amount Ft_change by using the limit value table T2 stored in advance or the limit value determined by the limit value determination section 55. FIG. 5B is a diagram showing a limit value table T2. In the limit value table T2 shown in FIG. 5B, a limit value is set for the change amount Fc_change of the command flow rate Fc transmitted to the electromagnetic pilot valve 33 based on the target flow rate change amount Ft_change. The limit value is set to increase as the change amount in the target flow rate increases. Further, when the change amount Ft_change of the target flow rate reaches the predetermined amount f1, the change amount Fc_change of the command flow rate Fc does not increase and becomes a constant value even when the change amount of the target flow rate becomes larger. The change in flow rate due to the movement of the valve body to one of the left and right (for example, right) pilot positions is represented by a positive value, and the change in flow rate due to the movement of the valve body to the other of the left and right (for example, left) pilot position is negative. The limit value when the valve body is moved to one pilot position is represented by a positive value, and the limit value when the valve body is moved to the other pilot position is represented by a negative value.

This limit value is a limit set in the change amount Fc_change of the command flow rate Fc. By setting a limit value for the change amount Fc_change of the command flow rate Fc in this way, even when the joystick lever 41 is suddenly operated, the valve body in the hydraulic valve 31 is prevented from suddenly operating, and it is possible to suppress the occurrence of vibration.

The second calculation section 54 calculates the current command flow rate Fc by adding the command flow rate Fc' one step before to the change amount Fc_change of the command flow rate determined by the change flow rate limit section 53.

The limit value determination section 55 determines the limit value used by the change flow rate limit section 53 based on the target flow rate Ft, the change amount Ft_change of the target flow rate, the command flow rate Fc' one step before, and the vehicle speed V_detect. When the vehicle speed V_detect is high, a fast steering operation is preferable, so it is better to set a large limit value. The details of the limit value determination section 55 will be described later.

(Limit Value Determination Section 55)

Figure 6:
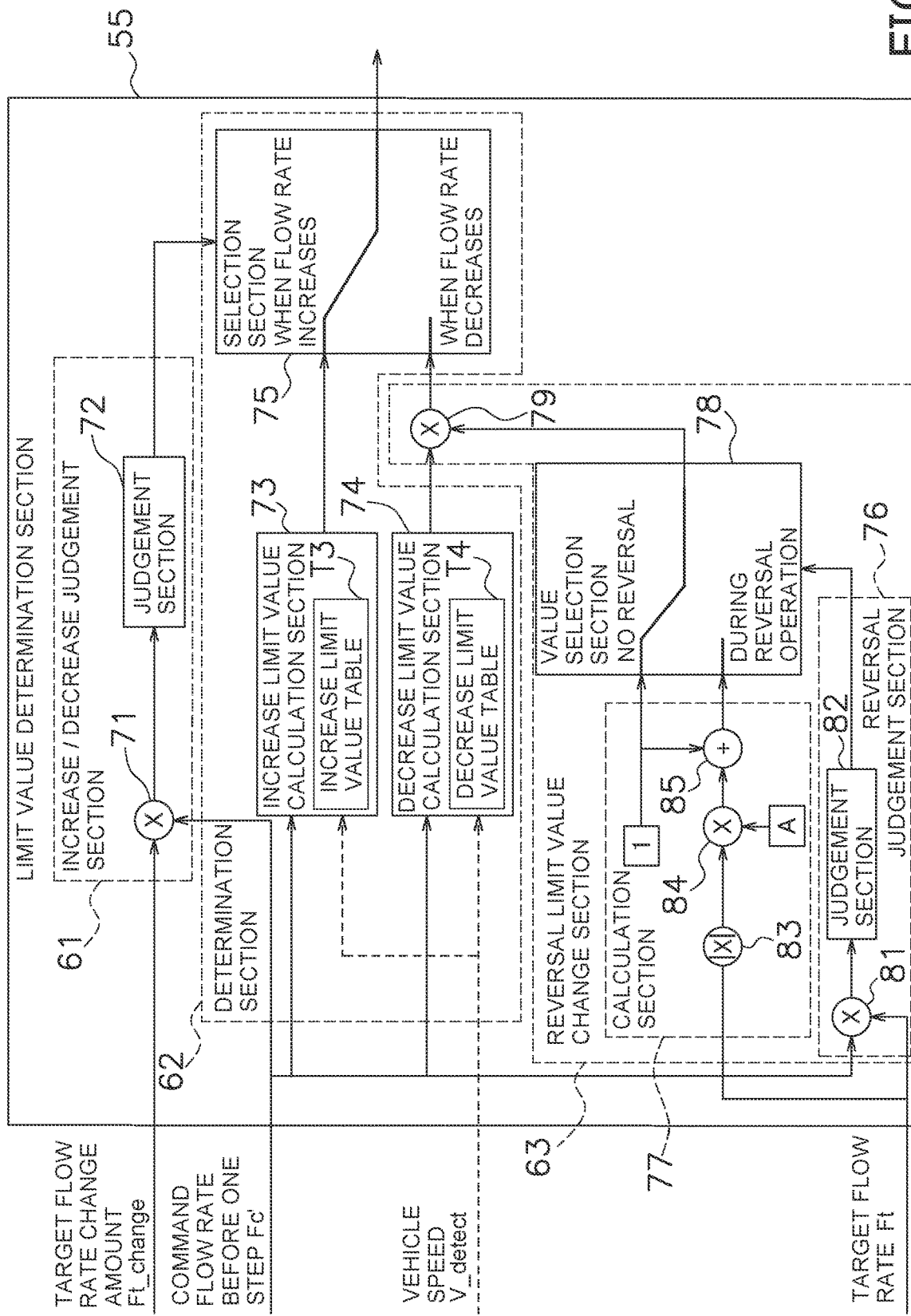
FIG. 6 is a block diagram showing a configuration of a limit value determination section of the controller in FIG. 4.

FIG. 6 is a block diagram showing a limit value determination section 55.

The limit value determination section 55 includes an increase/decrease judgement section 61, a determination section 62, and an reversal limit value change section 63.

(Increase/Decrease Judgement Section 61)

The increase/decrease judgement section 61 judges whether the flow rate is in the increasing direction or the decreasing direction. The increase/decrease judgement section 61 includes a third calculation section 71 and a judgement section 72. The third calculation section 71 calculates the product of the target flow rate change amount Ft_change and the command flow rate Fc' one step before.

For example, a positive value is set when the flow rate increases to the right, a negative value is set when the flow rate increases to the left, and the center position is set to zero. As a result, the judgement section 72 can judge that the flow rate increases when the product calculated by the third calculation section 71 has a positive value, and can judge that the flow rate decreases when the product has a negative value. For example, when the flow rate to the right increases, the change amount from the positive value flow rate becomes a positive value, so that the product becomes a positive value. When the flow rate to the left increases, the change amount from the negative value flow rate becomes a negative value, so the product becomes a positive value. When the flow rate to the right decreases, the change amount from the positive value flow rate becomes a negative value, so that the product becomes a negative value. When the flow rate to the left decreases, the change amount from the negative value flow rate becomes a positive value, so the product becomes a negative value.

(Determination Section 62)

The determination section 62 determines whether to use the limit value determined from the vehicle speed V_detect and the increase limit value table T3 or the limit value determined from the vehicle speed V_detect and the decrease limit value table T4 based on the judgement of the flow rate increase or the flow rate decrease from the judgement section 72.

The determination section 62 includes an increase limit value calculation section 73, a decrease limit value calculation section 74, and a selection section 75.

The increase limit value calculation section 73 calculates the limit value of the change amount in the flow rate when the flow rate increases, based on the preset increase limit value table T3.

The decrease limit value calculation section 74 calculates the limit value of the change amount in the flow rate when the flow rate decreases, based on the preset decrease limit value table T4. For example, the limit value when increasing the flow rate can be made larger than the limit value when decreasing the flow rate. When the steering operating speed is decelerated, the deceleration can be relatively slow, and when accelerating, the acceleration can be relatively fast.

The selection section 75 selects the limit value calculated by the increase limit value calculation section 73 or the limit value calculated by the decrease limit value calculation section 74 based on the judgement of the flow rate increase or the flow rate decrease from the judgement section 72. That is, when the judgement section 72 judges that the flow rate increases, the selection section 75 selects the limit value calculated by the increase limit value calculation section 73, and when the judgement section 72 judges that the flow rate decreases, the selection section 75 selects the limit value calculated by the decrease limit value calculation section 74.

Here, an example of control when the reversal operation described later is not performed and the limit value calculated by the increase limit value calculation section 73 or the decrease limit value calculation section 74 is used is shown.

Figure 7:
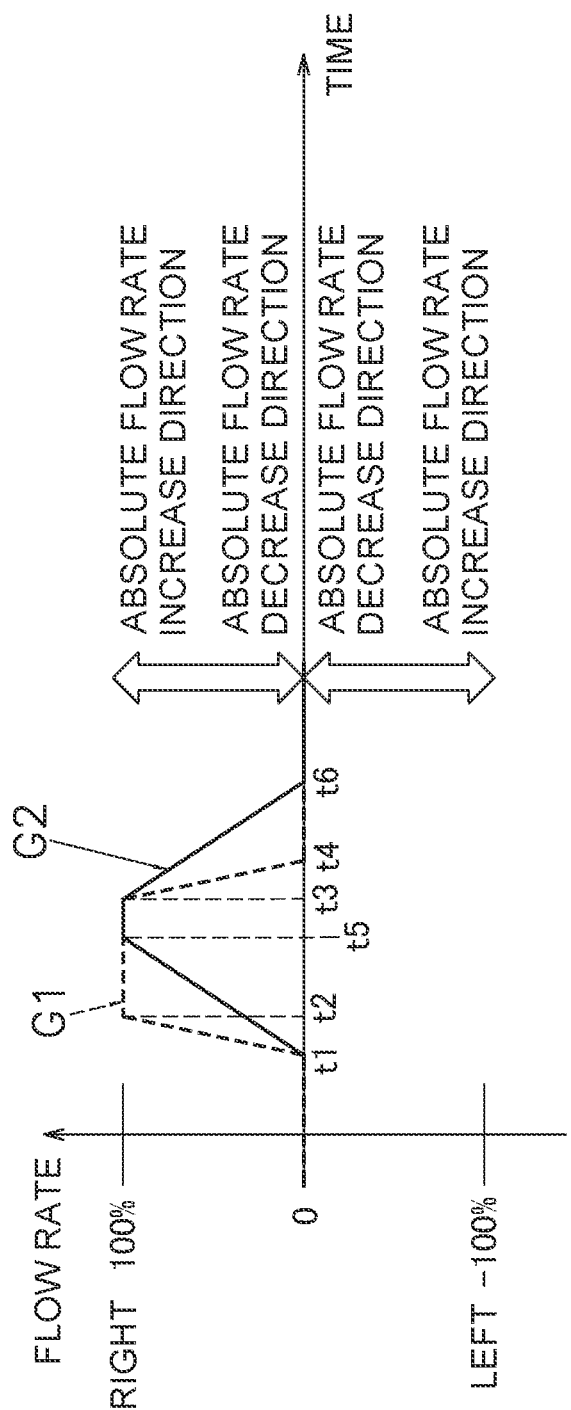
FIG. 7 is a diagram showing an example of a time change of a target flow rate and a command flow rate.

FIG. 7 is a diagram showing an example of time changes of the target flow rate Ft and the command flow rate Fc. FIG. 7 shows a case where the reversal operation described later is not performed. In FIG. 7, the graph G1 of the target flow rate Ft is shown by a dotted line, and the graph G2 of the command flow rate Fc is shown by a solid line.

In the graph G1 (dotted line) of the target flow rate Ft shown in FIG. 7, the operation of moving the joystick lever 41 100% to the right from the neutral position P1 (zero) and then returning it to the neutral position P1 is performed. In G1, the joystick lever 41 is operated to the right at time t1, the joystick lever 41 reaches the position where the flow rate is 100% at time t2, the joystick lever 41 is started to move to the neutral position P1 at time t3, and the joystick lever 41 is returned to the neutral position P1 at time t4.

Since the target flow rate is larger than the command flow rate and the absolute value of the control flow rate changes in the direction of increasing between the times t1 and t5, the limit value obtained by the increase limit value calculation section 73 is selected by the selection section 75. As a result, the change amount in the flow rate (in this case, the increase amount) is limited, and as shown in the times t1 to t5 of the graph G2, the operation of the valve body (spool) is controlled so as to reach to the right pilot position with the flow rate of 100% at the time t5 later than the time t2 of the target flow rate.

Further, the target flow rate is smaller than the command flow rate and the absolute value of the control flow rate changes in a the direction of decreasing between the times t3 and t6. Therefore, the limit value obtained by the decrease limit value calculation section 74 is selected by the selection section 75. As a result, the change amount in the flow rate (in this case, the decrease amount) is limited, and as shown in the times t3 to t6 of the graph G2, the operation of the valve body (spool) is controlled so as to reach to the neutral position P1 with a flow rate of 0% at the time t6 later than the time t4 of the target flow rate.

(Reversal Operation)

The above-described reversal limit value change section 63 changes the limit value during the reversal operation, but first, the reversal operation will be described.

FIG. 8A to 8C are schematic views for explaining the reversal operation. FIG. 8A to 8C show the movement of the joystick lever 41 in the upper row and the movement of the front frame 11 with respect to the rear frame 12 in the lower row. FIG. 8A shows a state in which the joystick lever 41 is arranged at the neutral position P1 and the front frame 11 is arranged in the front-rear direction with respect to the rear frame 12. When the joystick lever 41 is moved to the right Yr from the state of FIG. 8A as shown in FIG. 8B, the valve body of the electromagnetic pilot valve 33 moves to the right pilot position, and the front frame 11 rotates to the right (an example of the steering direction) with respect to the rear frame. As shown in FIG. 8C, operating the joystick lever 41 in the left direction Yl beyond the neutral position P1 during such rotation of the front frame 11 is called a reversal operation (also referred to as a reversal movement). The input to the joystick lever 41 corresponds to an example of a reversal operation command.

(Change of Limit Value During Reversal Operation)

Next, the change of the limit value in the reversal operation will be described.

First, in order to make the explanation easier, the case where the limit value is not changed during the reversal operation will be described.

Figure 9:
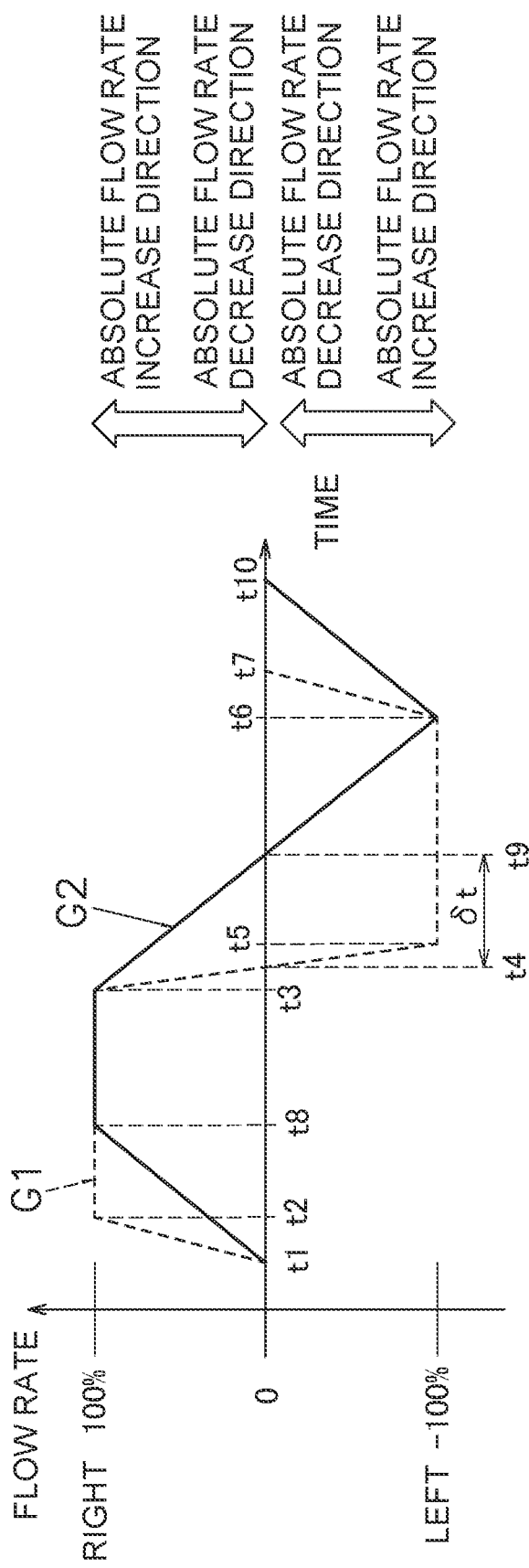
FIG. 9 is a diagram showing a graph of a command flow rate when a limit value is not changed during a reversal operation.

In FIG. 9, the graph G1 of the target flow rate Ft is shown by a dotted line, and the graph G2 of the command flow rate Fc is shown by a solid line.

In the graph G1 (dotted line) of the target flow rate Ft shown in FIG. 9, the operations of moving the joystick lever 41 100% to the right from the neutral position P1 (zero), then moving the joystick lever 41 100% to the left, and then returning the joystick lever 41 to the neutral position P1 are performed.

In the graph G1 of the target flow rate Ft, the joystick lever 41 is operated to the right at time t1, the joystick lever 41 reaches the position of 100% flow rate at time t2, and the joystick lever 41 starts to move to the left at time t3, the joystick lever 41 passes through the neutral position P1 at time t4, and reaches the position of 100% flow rate in the left direction at time t5. After that, it is stared to return the joystick lever 41 to the neutral position P1 at time t6, and the joystick lever 41 is returned to the neutral position P1 at time t7.

Since the absolute value of the command flow rate changes in the direction of increasing between the times t1 and t8, the limit value obtained by the increase limit value calculation section 73 is selected by the selection section 75. As a result, the change amount in the flow rate (the amount of increase in this case) is limited, and as shown in the times t1 to t8 of the graph G2, the operation of the valve body (spool) is controlled so as to reach the right pilot position in which the flow rate is 100% at the time t8 later than the time t2 of the target flow rate.

Further, since the absolute value of the command flow rate changes in the direction of decreasing between the times t3 and t9, the limit value obtained by the decrease limit value calculation section 74 is selected by the selection section 75. As a result, the change amount in the flow rate (the amount of decrease in this case) is limited, and as shown in the times t3 to t9 of the graph G2, the operation of the valve body (spool) is controlled so as to reach the neutral position P1 in which a flow rate is 0% at the time t9 later than the time t4 of the target flow rate.

Here, since the target flow rate Ft is the flow rate to the left at time t4 to t9 and the command flow rate Fc is the flow rate to the right at time t4 to t9, this is a reversal operation in which the joystick lever 41 is moved to the left while the front frame 11 is moved to the right.

Then, from time t9, which is later than time t5, the front frame 11 starts to rotate to the left with respect to the rear frame 12. In this way, the front frame 11 starts to rotate to the left from the time t9, which is delayed by δ t from the time t4 when the joystick lever 41 is operated to the left beyond the neutral position P1. This δ t is called the reversing delay time.

Since the absolute value of the command flow rate changes in the direction of increasing between the times t9 and t6, the limit value obtained by the increase limit value calculation section 73 is selected by the selection section 75. As a result, the change amount in the flow rate (the amount of increase in this case) is limited, and as shown in the times t9 to t6 of the graph G2, the operation of the valve body (spool) is controlled so as to reach the left pilot position in which the flow rate is 100% at the time t6 later than the time t5 of the target flow rate.

Since the absolute value of the command flow rate changes in the direction of decreasing between the times t6 and t10, the limit value obtained by the decrease limit value calculation section 74 is selected by the selection section 75. As a result, the change amount in the flow rate (the amount of decrease in this case) is limited, and as shown in the times t6 to t10 of the graph G2, the operation of the valve body (spool) is controlled so as to reach the neutral position P1 in which the flow rate is 0% at the time t10 later than the time t7 of the target flow rate.

When the reversing delay time during the reversal operation shown in FIG. 9 becomes long, the time for the front frame 11 to rotate in the direction opposite to the operating direction of the joystick lever 41 becomes long, which causes a sense of discomfort to the operator.

Figure 10:
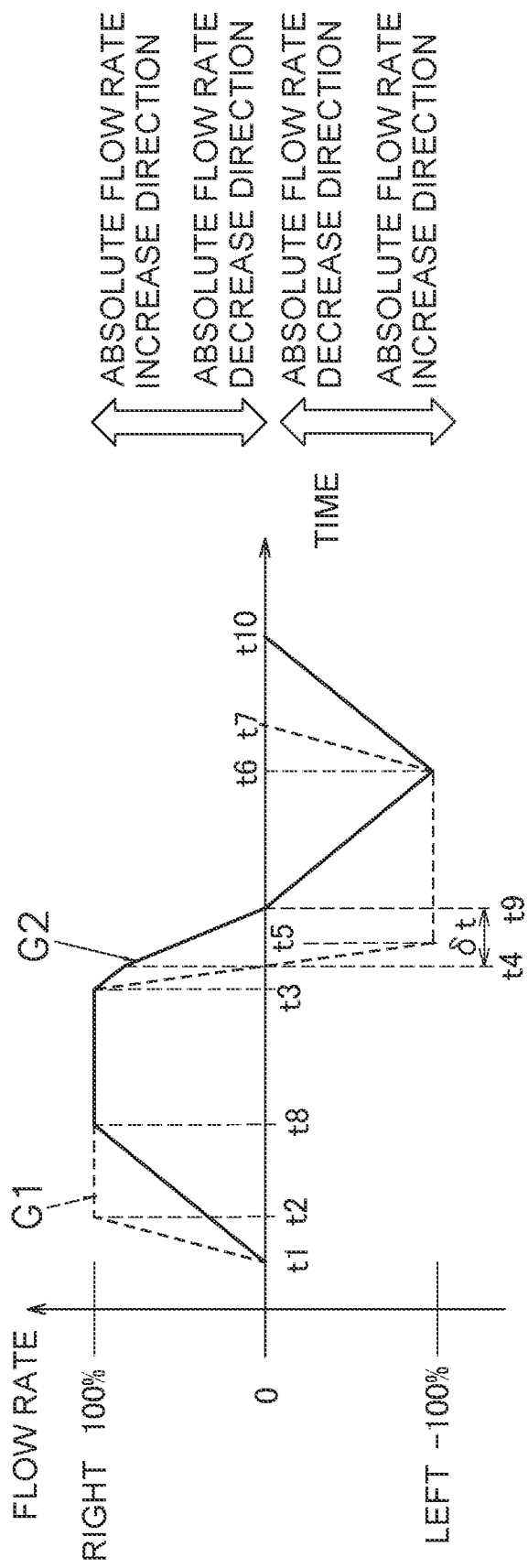
FIG. 10 is a diagram showing a graph of a command flow rate when a limit value is significantly changed during a reversal operation.

Therefore, in the wheel loader 1 of the present embodiment, as shown in FIG. 10, the reversing delay time is shortened by increasing the limit value of the change amount of the command flow rate Fc in the direction in which the flow rate decreases during the reversal operation. In FIG. 10, the joystick lever 41 exceeds the neutral position P1 at time t4, and the positive/negative of the command flow rate Fc' one step before and the target flow rate Ft are different, so that it is judged to be a reversal operation. Therefore, by setting a large limit value between the time t4 and t9 when the command flow rate Fc reaches zero, the change amount in the flow rate can be increased and the delay time δ t of the reversal operation can be shortened. From time t9, the change of the limit value is stopped and the limit value is returned to the original value.

The shorter the reversal operation delay time, the larger the vibration of the vehicle body in the reversal movement. However, in the present embodiment, by appropriately setting the limit value, the reversal operation delay time can be also shortened while suppressing the vibration.

On the other hand, as shown in FIG. 10, when the limit value of the change amount in the flow rate decreasing direction is increased during the reversal operation, regardless of whether the amount of operation in the opposite direction (to the left in the example of FIG. 10) is large or small, the reversing delay time is similarly shortened. For this reason, even when the amount of operation in the opposite direction during the reversal operation is extremely small, vibration during reversing occurs as in the case where the amount of operation is large, which causes a sense of discomfort to the operator.

Therefore, in the wheel loader 1 of the present embodiment, the control is performed to decrease the command flow rate Fc to 0 (zero) relatively quickly when the operation amount in the opposite direction is large during the reversal operation, and the control is performed to decrease the command flow rate Fc to 0 (zero) relatively slowly when the operation amount in the opposite direction is small.

Figure 11:
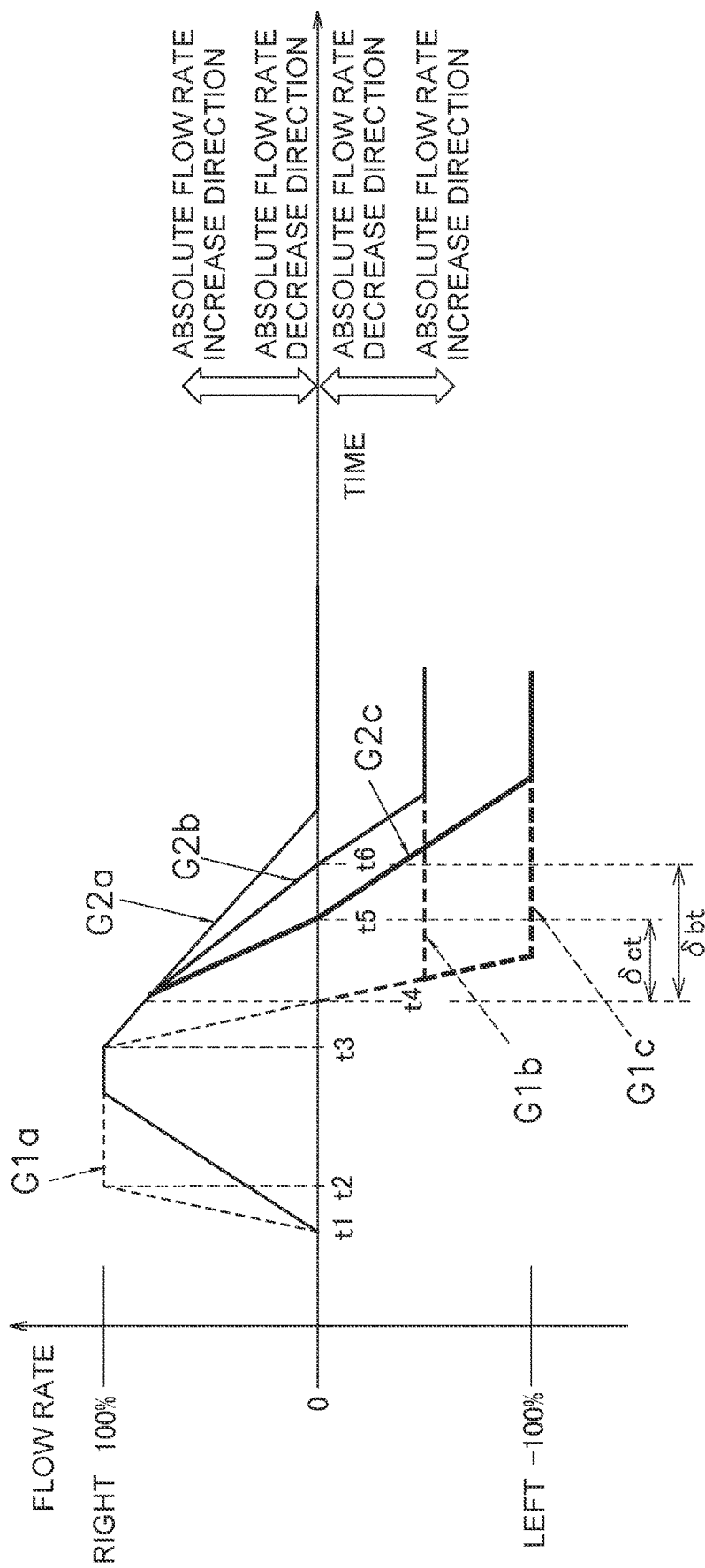
FIG. 11 is a diagram showing a graph of a command flow rate when a limit value is changed according to an amount exceeding a neutral position during a reversal operation.

FIG. 11 is a diagram showing a graph in which the limit value of the change amount of the command flow rate Fc is changed based on the operation amount in the opposite direction during the reversal operation.

The graph G1a (dotted line) shows a state in which the joystick lever 41 is operated a position where the flow rate is 100% to the right from the neutral position P1 (zero) and then returned to the neutral position P1. The graph G1b (dotted line) shows a state in which the joystick lever 41 is operated from the neutral position P1 (zero) to a position where the flow rate is 100% to the right and then the joystick lever 41 is operated beyond the neutral position P1 to a position where the flow rate is about −50% to the left. The graph G1c (dotted line) shows a state in which the joystick lever 41 is operated from the neutral position P1 (zero) to a position where the flow rate is 100% to the right, and then is operated beyond the neutral position P1 to a position where the flow rate is −100% to the left.

The graph of the change in the command flow rate Fc during the operation of the graph G1a is shown by G2a (solid line), the graph of the change in the command flow rate Fc during the operation of the graph G1b is shown by the G2b (solid line), and the graph of the change of the command flow rate Fc during the operation of the graph G1c is shown by G1c (solid line).

In the case of the operation shown in the graph G1a, the reversal operation is not performed, so that in the graph G2a of the command flow rate Fc, the change amount is limited by a predetermined limit value at the time of decrease from the position where the flow rate is 100% in the right direction and the flow rate becomes 0 (zero).

In the graph G2b, the reversing delay time from the time t4 of the determination that the reversal operation is performed to the time t6 when the flow rate becomes 0 (zero) is shown as the time δ bt. In the graph G2c, the reversing delay time from the time t4 of the determination that the reversal operation is performed to the time t5 when the flow rate becomes 0 (zero) is shown as the time δ ct.

In the graph G2b, since the operation is performed to the position where the flow rate is about 50% to the left, the limit value of the change amount is smaller than that of the graph G2c operating to the position where the flow rate is 100% to the left, and the reversing delay time δ bt is slower than the reversing delay time δ ct in the graph G2c. In FIG. 11, the reversing delay time in the graph G2b is indicated by δ bt, and the reversing delay time in the graph G2c is indicated by δ ct.

The reversal limit value change section 63 for changing the limit value of the change amount when the flow rate decreases in the reversal operation as shown in FIG. 11 will be described below.

(Reversal Limit Value Change Section 63)

As shown in FIG. 6, the reversal limit value change section 63 includes a reversal judgement section 76, a calculation section 77, a value selection section 78, and a change value reflection calculation section 79.

The reversal judgement section 76 includes a fourth calculation section 81 and a judgement section 82. The fourth calculation section 81 calculates the product of the command flow rate Fc' one step before and the target flow rate Ft. When the product is larger than 0 (zero), the judgement section 82 judges that the reversal operation is not performed. Further, when the product is smaller than 0 (zero), the judgement section 82 judges that the reversal operation is performed. When the command flow rate Fc' is the flow rate to the right steering position, the value of the command flow rate Fc' is positive, and when the reversal operation is performed, the target flow rate Ft is the flow rate to the left steering position, so the value of the target flow rate is negative. Therefore, the product is smaller than 0 (zero). Further, when the command flow rate Fc is the flow rate to the left steering position, the value of the command flow rate Fc becomes negative, and when the reversal operation is performed, the target flow rate Ft is the flow rate to the right steering position, so the value of the target flow rate Ft is positive. Therefore, the product is smaller than 0 (zero). On the other hand, in the case of no reversal operation, the positive/negative of the command flow rate Fc' and the target flow rate Ft are the same, so that the product is larger than 0 (zero).

In this way, the reversal judgement section 76 judges the reversal operation of the wheel loader 1.

The calculation section 77 includes a fifth calculation section 83, a sixth calculation section 84, and a seventh calculation section 85.

The fifth calculation section 83 calculates the absolute value of the target flow rate Ft. The sixth calculation section 84 calculates the product of the absolute value of the target flow rate Ft and the preset change constant A. The seventh calculation section 85 adds the preset steady-state value of "1" to the calculated value of the product |Ft|×A and calculates the change value (1+|Ft|×A) of the limit value during the reversal operation.

The value selection section 78 selects the steady value of "1" or the calculated change value based on the judgement result of the reversal judgement section 76. The value selection section 78 selects the steady value of "1" when the reversal judgement section 76 judges that the reversal operation is not performed, and selects the change value (1+|Ft|×A) when the reversal judgement section 76 judges that the reversal operation is performed.

The change value reflection calculation section 79 multiplies the limit value calculated by the decrease limit value calculation section 74 by the steady value of "1" or the change value (1+|Ft|×A) selected by the value selection section 78. Thereby, the limit value calculated by the decrease limit value calculation section 74 can be changed.

When it is judged that the reversal operation is not performed, since the steady-state value of "1" is multiplied by the limit value calculated by the decrease limit value calculation section 74, so that the limit value is not changed. On the other hand, when it is judged that the reversal operation is performed, since the change value (1+|Ft|×A) is multiplied by the limit value calculated by the decrease limit value calculation section 74, so that the limit value is changed. This makes it possible to change the limit value during the reversal operation.

For example, in the case of the graph of the command flow rate Fc with respect to the target flow rate of the graph G1a shown in FIG. 11 in which the reversal operation is not performed, the steady value of "1" is selected by the value selection section 78. As a result, the change value reflection calculation section 79 multiplies the steady-state value of "1" by the limit value calculated by the decrease limit value calculation section 74, so that the limit value is not changed and the preset limit value is used.

For example, in the case of the graph G1c, the joystick lever 41 is operated from the state where the flow rate is 100% to the right, and the operation is performed to the state where the flow rate is −100% to the left. After the time t4, the target flow rate becomes a negative value, but the command flow rate Fc remains a positive value, so that the product by the fourth calculation section 81 becomes a negative value, and the judgement section 82 judges that the reversal operation is performed. The fifth calculation section 83 calculates a value of "100" from −100%. Here, assuming that the value of A is, for example, "0.01", the sixth calculation section 84 calculates 100×0.01 and calculates the value of "1". Next, the seventh calculation section 85 adds the steady value of "1" and the "1" calculated by the sixth calculation section 84, and "2" of the change value is calculated. Since the reversal operation is in progress, "2" is selected by the value selection section 78, the change value reflection calculation section 79 multiplies the limit value calculated by the decrease limit value calculation section 74 by "2", and the limit value is doubled. In this way, when the flow rate is operated up to −100% during the reversal operation, the limit value is doubled, and it is possible to double the change amount when the flow rate is decreased as compared with the change amount when the flow rate is decreased without the reversal operation (graph G1a in FIG. 11).

Further, for example, in the case of the graph G2b, the joystick lever 41 is operated from the state where the flow rate is 100% in the right direction, and the operation is performed in the state where the flow rate is −50% in the left direction. After the time t4, the target flow rate becomes a negative value, but the command flow rate Fc remains a positive value, so that the product by the fourth calculation section 81 becomes a negative value, and the judgement section 82 judges that the reversal operation is performed. The fifth calculation section 83 calculates a value of "50" from −50%. Here, assuming that the value of A is, for example, "0.01", 50×0.01 is calculated by the sixth calculation section 84, and a value of "0.5" is calculated. Next, the steady value of "1" and "0.5" calculated by the sixth calculation section 84 are added by the seventh calculation section 85, and the change value "1.5" is calculated. Since the reversal operation is in progress, "1.5" is selected by the value selection section 78, and the change value reflection calculation section 79 multiplies the limit value calculated by the decrease limit value calculation section 74 by "1.5" and the limit value is 1.5 times. In this way, when the flow rate is operated up to −50% during the reversal operation, the change amount when the flow rate is decreased can be increased by 1.5 times as compared with the change amount when the flow rate is decreased without the reversal operation (graph G1a in FIG. 11).

In this embodiment, since the target flow rate Ft is calculated for each step of the controller 23, the limit value also changes according to the change in the target flow rate. That is, in the graph G1c, the limit value is calculated step by step until the target flow rate Ft exceeds the flow rate 0 and reaches the state of the flow rate −100% to the left.

Further, in FIG. 11, the reversal operation (referred to as reversing from right to left) when the joystick lever 41 is moved to the left while the front frame 11 is moving to the right has been described. The same applies to the reversal operation (referred to as reversing from left to right) when the joystick lever 41 is moved to the right while the front frame 11 is moving to the left.

Operation

Figure 12:
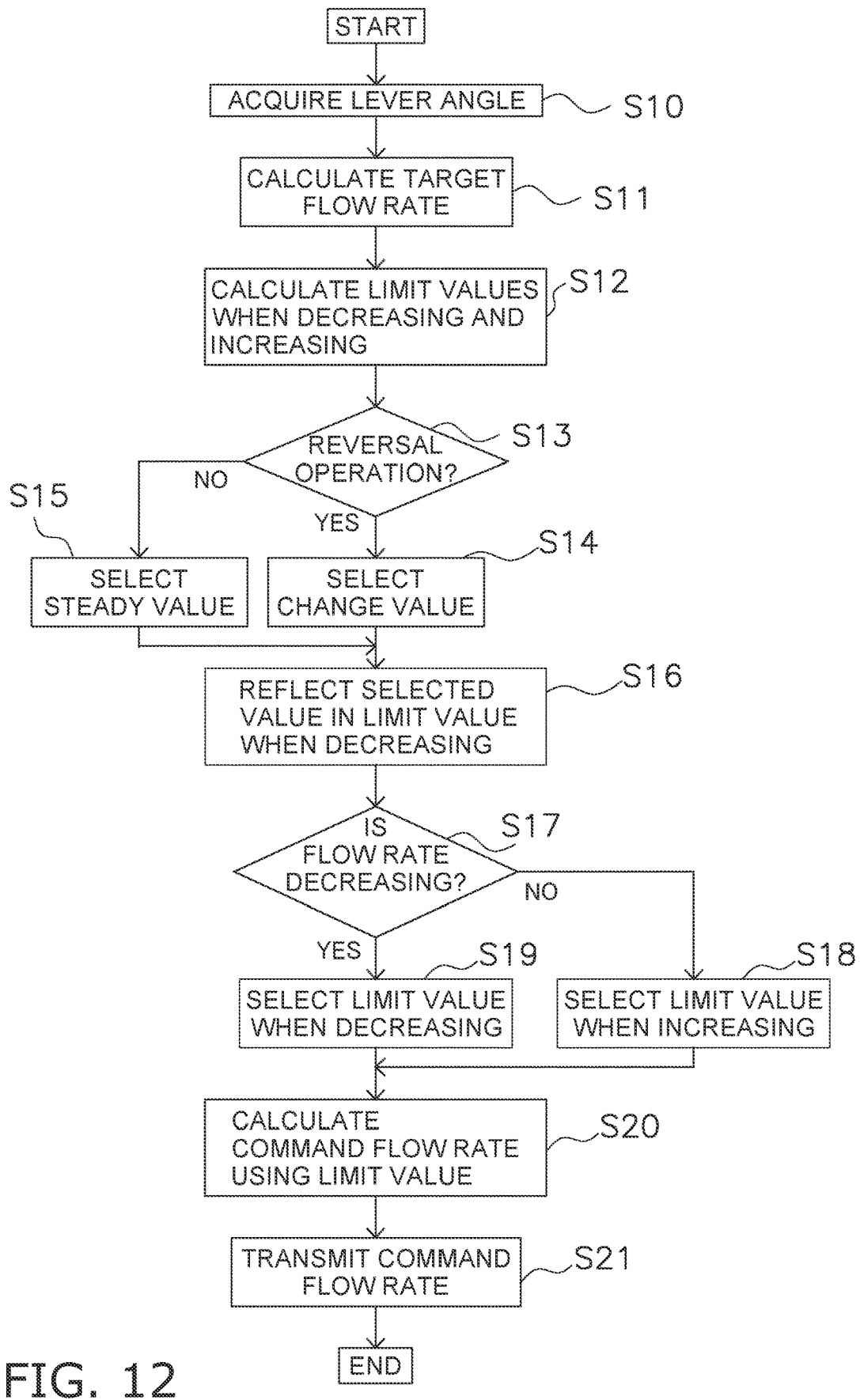
FIG. 12 is a flow chart showing a control operation of the wheel loader in the first embodiment according to the present disclosure.

Next, the operation of the wheel loader 1 of the present disclosure will be described. FIG. 12 is a flow chart showing the operation of the wheel loader 1.

First, in step S10, the controller 23 acquires the lever angle θ i_detect detected by the lever angle sensor 43.

Next, in step S11, the target flow rate calculation section 51 of the controller 23 calculates the target flow rate Ft using the lever angle-target flow rate table T1.

Next, in step S12, the increase limit value calculation section 73 calculates the limit value at the time of increase using the increase limit value table T3 based on the command flow rate Fc' one step before and the vehicle speed V. Further, the decrease limit value calculation section 74 calculates the limit value at the time of decrease using the decrease limit value table T4 based on the command flow rate Fc' one step before and the vehicle speed V. Step S12 corresponds to an example of the determination step.

Next, in step S13, the reversal judgement section 76 judges whether or not the wheel loader 1 is in the reversal operation based on the target flow rate Ft and the command flow rate Fc' one step before.

When it is judged in step S13 that the reversal operation is performed, the value selection section 78 selects the change value in step S14. The change value is a value calculated by the fifth calculation section 83, the sixth calculation section 84, and the seventh calculation section 85, and is $(1+|Ft| \times A)$.

When it is judged in step S13 that the reversal operation is not performed, the value selection section 78 selects the steady value (1 in FIG. 6) in step S15.

Next, in step S16, the change value reflection calculation section 79 reflects the selected value from the steady value or the change value in the decrease calculation value calculated in step S12.

Next, in step S17, as described above, the increase/decrease judgement section 61 judges whether the target flow rate Ft is increasing or decreasing from the command flow rate Fc' one step before.

When it is judged in step S17 that the flow rate is increasing, the selection section 75 selects the limit value at the time of increase in step S18.

On the other hand, when it is judged in step S17 that the flow rate is decreasing, the selection section 75 selects the limit value at the time of decrease in step S19.

Next, in step S20, the change flow rate limit section 53 calculates the change amount Fc_change in the command flow rate based on the selected limit value, and the second calculation section 54 adds the command flow rate Fc' one step before to the calculated change amount Fc_change of the command flow rate, and the command flow rate Fc is calculated. Steps S13 to S20 correspond to an example of a control step.

Next, in step S21, the command flow rate Fc is transmitted from the controller 23 to the electromagnetic pilot valve 33. The spool of the electromagnetic pilot valve 33 moves based on the command flow rate Fc, and the hydraulic valve 31 is operated. The movement of the spool of the hydraulic valve 31 changes the amount of hydraulic fluid supplied to the steering cylinders 9a and 9b, and the steering operation is performed. Step S21 corresponds to an example of a transmission step.

Embodiment 2

In the first embodiment, the reversal judgement section 76 judges whether or not the reversal operation is performed depending on whether the product of the command flow rate Fc' one step before and the target flow rate Ft is a positive value or a negative value. This means that the operation is determined to be a reversal operation when the operation of the joystick lever 41 exceeds the neutral position P1 while the front frame 11 is rotating in one direction. The judgement of the reversal operation is performed using the neutral position (the position where the flow rate is zero in FIG. 11) as example of the first predetermined threshold value.

When it is judged that the reversal operation is not performed, the steady value 1 is selected and the value calculated by the decrease limit value calculation section 74 is used as it is, so that an example of the second predetermined threshold value at which the change of the limit value is stopped and the limit value is returned to the original value is also the neutral position P1 (the position where the flow rate is zero in FIG. 11)

On the other hand, in the second embodiment, the first predetermined threshold value for judging the reversal operation does not have to be limited to the neutral position P1, and the second predetermined threshold value at which the change of the limit value is stopped and the limit value is returned to the original value does not have to be limited to the neutral position P1.

Figure 13:
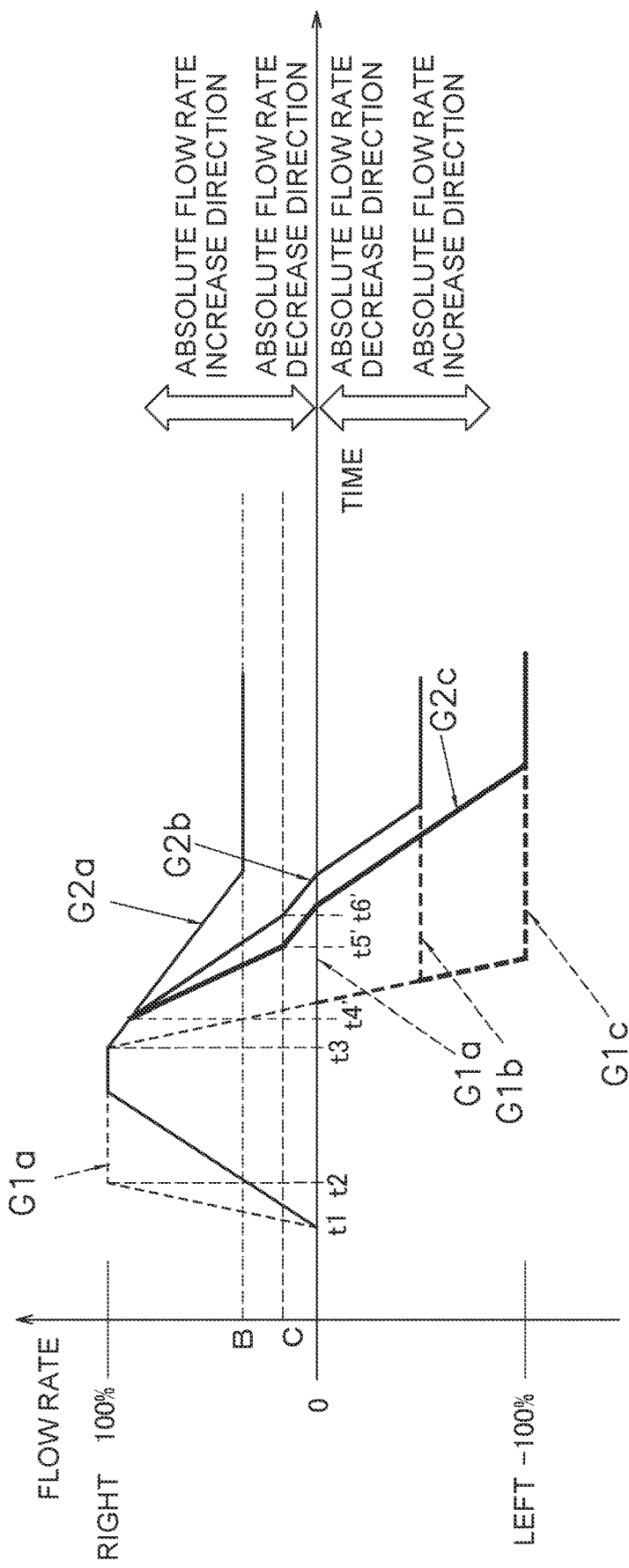
FIG. 13 is a diagram showing a graph of changes in the command flow rate of the wheel loader in the second embodiment according to the present disclosure.

FIG. 13 is a diagram showing a graph in which the first predetermined threshold value for judging the reversal operation is B, and the second predetermined threshold value at which the change of the limit value is stopped and the limit value is returned to the original value is C. In FIG. 13, as an example, the threshold value B is set to a positive value, and the threshold value C is set to a positive value. In this case, the time of the judgement that the reversal operation is performed is t4', which is faster than the time t4 in FIG. 11. Further, in FIG. 13, the time at which the change of the limit value is stopped and the limit value is returned to the original value is shown as t6' in the graph G2b, and in the graph G2b, after the limit value is returned to the limit value without the reversal operation by the value selection section 178 at the time t6', the limit value becomes the limit value at the time of increase calculated by the increase limit value calculation section 73. Further, in the graph G2c, the time at which the change of the limit value is stopped and the limit value is returned to the original value is shown as t5', and in the graph G2c, after the limit value is returned to the limit value without the reversal operation by the value selection section 178 at the time t5', the limit value becomes the limit value at the time of increase calculated by the increase limit value calculation section 73. FIG. 13 describes the reversal operation (referred to as reversing from right to left) when the joystick lever 41 is moved to the left while the front frame 11 is moving to the right. In the case of a reversal operation (referred to as reversing from left to right) when the joystick lever 41 is moved to the right while the front frame 11 is moving to the left, the thresholds B and C are negative values.

Since the threshold values B and C can be set in the wheel loader 1 of the second embodiment, the wheel loader 1 includes a limit value determination section 155 different from the limit value determination section 55 of the first embodiment.

Figure 14:
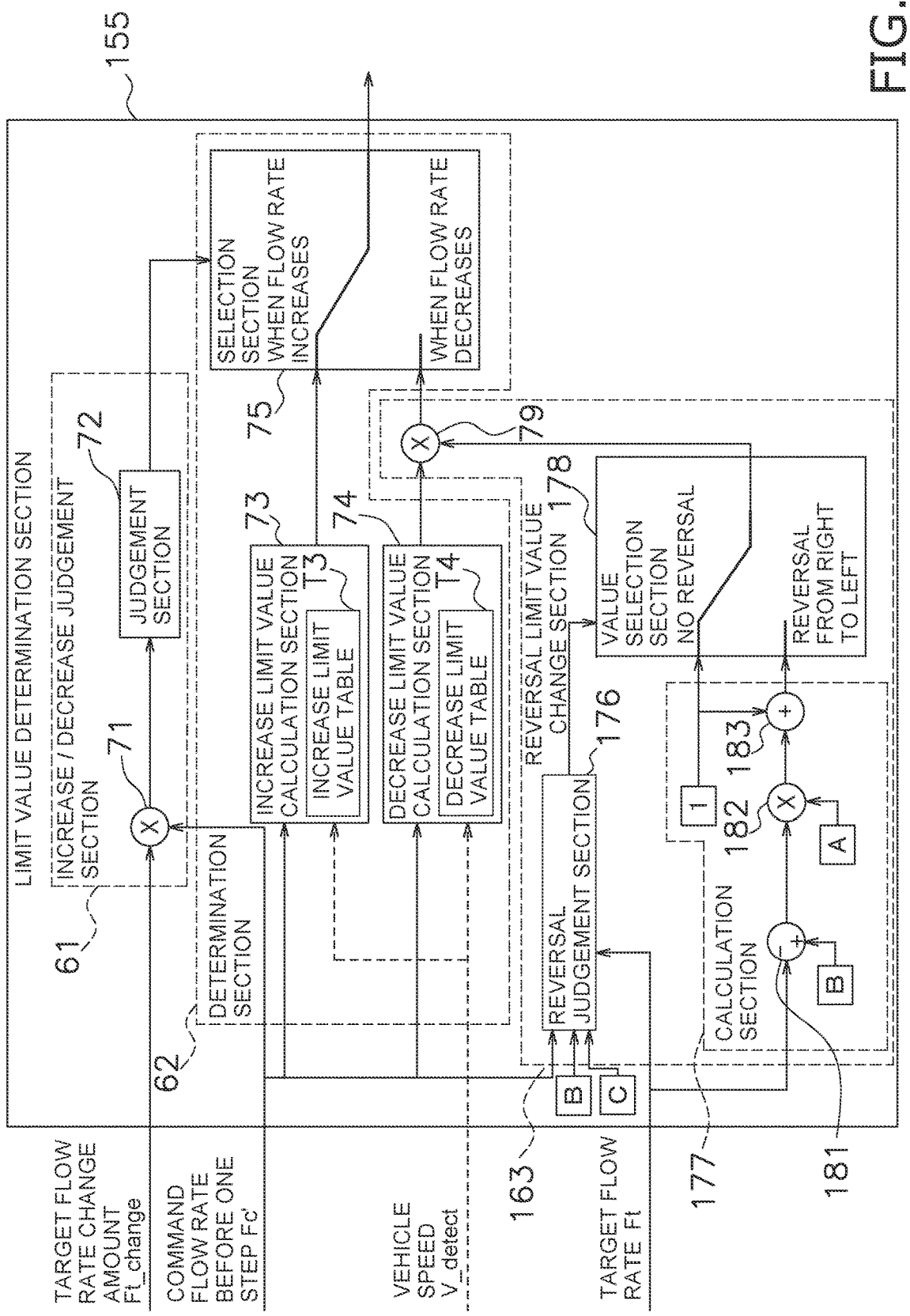
FIG. 14 is a block diagram showing a configuration of a limit value determination section in a second embodiment according to the present disclosure.

FIG. 14 is a diagram showing a limit value determination section 155 of the second embodiment. The limit value determination section 155 has a reversal limit value change section 163, which is different from that of the first embodiment, as compared with the limit value determination section 55 of the first embodiment.

The reversal limit value change section 163 of the second embodiment includes a reversal judgement section 176, a calculation section 177, and a value selection section 178.

The reversal judgement section 176 determines whether or not the reversal operation is being performed. The reversal judgement section 176 can judge that the operation is the reversal operation from right to left when the command flow rate Fc' one step before >C and the target flow rate Ft<B. As a result, it can be judged that the joystick lever 41 has been operated beyond the threshold value B in the right-to-left reversal operation, and the limit value can be changed. Further, when Fc'<C or Ft>B is reached during the reversal from right to left, it is judged that the reversal operation is not in progress. By Fc'<C, it can be judged that the command flow rate Fc has reached the threshold value C in the right-to-left reversal operation, and the change of the limit value can be stopped and the limit value can be returned to the original value. Further, by Ft>B, it can be judged that the reversal operation is completed by returning the joystick lever 41 to the right side of the threshold value B.

The reversal judgement section 176 can judge that the reversal operation from left to right is performed when the command flow rate Fc'<−C and the target flow rate Ft>−B one step before. Thereby, in the reversal operation from left to right, it can be judged that the joystick lever 41 has been operated beyond the threshold value B, and the limit value can be changed. Further, when Fc'>−C or Ft<−B is reached during the reversal operation from left to right, it is judged that the reversal operation is not in progress. By Fc'>−C, it can be judged that the command flow rate Fc has reached the threshold value C in the reversal operation from left to right, and the change of the limit value can be stopped and the limit value can be returned to the original value. Further, by Ft<−B, it can be judged that the reversal operation is completed by returning the joystick lever 41 to the left side of the threshold value B.

The calculation section 177 includes a seventh calculation section 181, an eighth calculation section 182, and a ninth calculation section 183. The seventh calculation section 181 and the eighth calculation section 182 and the ninth calculation section 183 calculate the change value at the time of reversal from right to left. The seventh calculation section 181 calculates the difference of the target flow rate Ft from the threshold value B, and the eighth calculation section 182 multiples the difference by the change constant A. The ninth calculation section 183 can add the steady-state value of "1" to the multiplied result and obtain the change value at the time of the right-to-left reversal operation. As a result, the larger the difference that the target flow rate Ft exceeds to the side smaller than the threshold value B, the larger the value of the change value. Therefore, the limit value can be increased by the calculation of the change value reflection calculation section 79.

Although not shown, the change value during the reversal operation from left to right is obtained by adding the target flow rate Ft and the threshold value B, multiplying the added result by the change constant A, and adding the steady value of "1" to the multiplied result.

The value selection section 178 selects one of the steady value of "1", the change value during the right to left reversal operation, and the change value during the left to right reversal operation according to any judgement of no reversal operation, the reversal operation right to left, and the reversal operation left to right by the reversal judgement section 176. The selected steady value of "1" or the change value is reflected in the limit value at the time of decrease by the change value reflection calculation section 79.

Features (1)

The valve system 8 according to the present embodiment includes an electromagnetic pilot valve 33 (an example of a valve) and a controller 23 (an example of a control section). The electromagnetic pilot valve 33 adjusts the flow rate of hydraulic fluid for steering the wheel loader 1 (an example of a work machine). The controller 23 determines a command signal to the electromagnetic pilot valve 33 determining the command flow rate Fc of the hydraulic fluid based on the target flow rate Ft corresponding to the input operation command and the change amount Ft_change of the target flow rate Ft. The controller 23 controls the change amount according to the magnitude of the reversal operation command when receiving the reversal operation command for operating the wheel loader 1 in the direction opposite to the direction in which the steering is operating.

In this way, since the change amount in the flow rate can be controlled according to the magnitude of the reversal operation command, it is possible to alleviate the sudden stoppage of the input/output of hydraulic fluid during the reversal operation, and suppress the vibration of the vehicle body.

Further, for example, when the control is performed so as to limit the change amount in the flow rate, the steering operation is delayed with respect to the operation of the joystick lever 41, but the change amount can be controlled according to the magnitude of the reversal operation command. For example, when the reversal operation command is large (the joystick lever 41 is operated greatly in the opposite direction), the operator wants to change the steering direction quickly even when some vibration occurs. Therefore, by setting the change amount in the flow rate to be large, it is possible to change the steering direction quickly, and to realize the operation of the wheel loader 1 according to the intention of the operator. Further, for example, when the reversal operation command is small (the joystick lever 41 is operated slightly in the opposite direction), it is considered that the operator does not intend to change the steering direction quickly. Therefore, by setting the change amount in the flow rate to be small, it is possible to slow down the change of the steering direction and realize the operation of the wheel loader 1 according to the intention of the operator.

(2)

In the valve system 8 according to the present embodiment, the controller 23 (an example of the control section) increases the change amount when the reversal operation command is large.

As a result, the larger the reversal operation command, the faster the steering operation speed can be.

(3)

In the valve system 8 according to the present embodiment, the controller 23 (an example of the control section) determines the command flow rate based on the limit value for the change amount and the target flow rate Ft. When the controller 23 receives the reversal operation command, the controller 23 changes the limit value according to the difference between the target flow rate Ft and the neutral position P1 (an example of a first predetermined threshold value) or the threshold value B (an example of a first predetermined threshold value).

Since the change in the flow rate is limited in this way, it is possible to alleviate the sudden stoppage of the input/output of the hydraulic fluid during the reversal operation, and it is possible to suppress the vibration of the vehicle body.

Further, since the limit value is provided, the steering operation is delayed with respect to the operation of the joystick lever 41, but in the present embodiment, the limit value is changed according to the difference between the target flow rate Ft and the first predetermined threshold value. For example, when the operating member is largely operated in the opposite direction beyond the first predetermined threshold value, the operator wants to change the steering direction quickly even when some vibration occurs. Therefore, by setting the limit value to be large, it is possible to change the steering direction quickly, and to realize the operation of the wheel loader 1 according to the intention of the operator. Further, for example, when the joystick lever 41 is slightly operated in the opposite direction beyond the first predetermined threshold value, it is considered that the operator does not intend to change the steering direction quickly. Therefore, by setting the change amount in the flow rate to be small, it is possible to slow down the change of the steering direction and realize the operation of the wheel loader 1 according to the intention of the operator.

(4)

In the valve system 8 according to the present embodiment, the controller 23 stops the change of the limit value when the command flow rate Fc reaches the neutral position P1 (an example of the second predetermined threshold value) or the threshold value C (an example of the second predetermined threshold value), and returns to the preset limit value of the change amount in the flow rate.

As a result, when the reversal operation is completed, it is possible to stop the change of the limit value and to return the limit value to the original limit value.

(5)

The valve system 8 according to the present embodiment further includes a joystick lever 41 capable of inputting a target flow rate Ft. The first predetermined threshold value is the neutral position P1 of the joystick lever 41.

As a result, the limit value of the change amount in the flow rate can be changed according to the degree to which the target flow rate Ft exceeds the neutral position P1.

(6)

The valve system 8 according to the present embodiment further includes a joystick lever 41 capable of inputting a target flow rate Ft. The second predetermined threshold is the neutral position P1.

As a result, when the target flow rate Ft reaches the neutral position P1, it is possible to stop the change of the limit value and return the limit value to the original limit value.

(7)

In the valve system 8 according to the present embodiment, the controller 23 changes so that the larger the difference between the target flow rate Ft and the neutral position P1 or the threshold value B, the larger the limit value.

As a result, the speed of the steering operation can be increased as the target flow rate Ft exceeds the first predetermined threshold value.

(8)

In the valve system 8 according to the present embodiment, the limit value is different when the flow rate decreases and when the flow rate increases.

Thereby, for example, the limit value when increasing the flow rate can be made larger than the limit value when decreasing the flow rate, and the operating speed of the steering can be accelerated relatively quickly.

(9)

The valve system 8 according to the present embodiment further includes a joystick lever 41 capable of inputting a target flow rate Ft. The controller 23 obtains the target flow rate based on the angle from the center position of the joystick lever 41.

As a result, in the speed control in which the steering is operated according to the movement amount of the joystick lever 41 from the neutral position P1, it is possible to suppress the vibration of the vehicle body during the reversal operation, and to realize the operation of the work machine according to the operator's intention.

(10)

In the valve system 8 according to the present embodiment, the neutral position P1 of the joystick lever 41 is the central position.

As described above, in the speed control, the neutral position P1 of the joystick lever 41 is provided at the center position on the left and right of the operating member.

(11)

The wheel loader 1 (an example of a work machine) according to the present embodiment includes a front frame 11, a rear frame 12, a connecting shaft part 13 (an example of an articulate mechanism), a valve system 8, and steering cylinders 9*a* (an example of a hydraulic actuator), and 9*b* (an example of a hydraulic actuator). The connecting shaft part 13 rotatably connects the front frame 11 to the rear frame 12. The steering cylinders 9*a* and 9*b* operate with the hydraulic fluid supplied from the valve system 8 to drive the connecting shaft part 13.

As a result, in the wheel loader 1, it is possible to suppress the vibration of the vehicle body during the reversal operation and realize the operation of the wheel loader 1 according to the intention of the operator.

(12)

The method for controlling the valve of the present embodiment is the method for controlling the valve for adjusting the flow rate of hydraulic fluid for steering the wheel loader 1, and includes step S12 (an example of a determination step) and step S21 (an example of a transmission step) and steps S13 to S20 (an example of a control step). The step S12 determines the command signal to the electromagnetic pilot valve 33 (an example of a valve) determining the command flow rate Fc of the hydraulic fluid based on the target flow rate Ft corresponding to the input operation command and the change amount Ft_change of the target flow rate Ft. Step 21 transmits a signal regarding the command flow rate Fc to the electromagnetic pilot valve 33. Steps S13 to S20 controls the change amount according to the magnitude of the reversal operation command when receiving the reversal operation command for operating the wheel loader 1 in the direction opposite to the direction in which the steering is operating.

In this way, since the change amount in the flow rate can be controlled according to the magnitude of the reversal operation command, it is possible to alleviate the sudden stoppage of the input/output of hydraulic fluid during the reversal operation, and suppress the vibration of the vehicle body.

Further, for example, when the control is performed so as to limit the change amount in the flow rate, the steering operation is delayed with respect to the operation of the joystick lever 41, but the change amount can be controlled according to the magnitude of the reversal operation command. For example, when the reversal operation command is large (the joystick lever 41 is operated greatly in the opposite direction), the operator wants to change the steering direction quickly even when some vibration occurs. Therefore, by setting the change amount in the flow rate to be large, it is possible to change the steering direction quickly, and to realize the operation of the wheel loader 1 according to the intention of the operator. Further, for example, when the reversal operation command is small (the joystick lever 41 is operated slightly in the opposite direction), it is considered that the operator does not intend to change the steering direction quickly. Therefore, by setting the change amount in the flow rate to be small, it is possible to slow down the change of the steering direction and realize the operation of the wheel loader 1 according to the intention of the operator.

Other Embodiments

Although one embodiment of the present disclosure has been described above, the present disclosure is not limited to the above-described embodiment, and various changes can be made without departing from the gist of the present disclosure.

(A)

In the above embodiment, the speed control in which the steering is operated according to the movement amount of the joystick lever 41 from the neutral position P1 has been described, but also the above embodiment can be applied to a position control in which the operating angle of the operating member corresponds to the steering angle of the work machine.

In the above embodiment, the target flow rate is calculated based on the detection angle $\theta$ i_detect, but the target flow rate may be calculated based on the deviation between the operation angle of the joystick lever 41 and the steering angle of the wheel loader 1.

Figure 15:
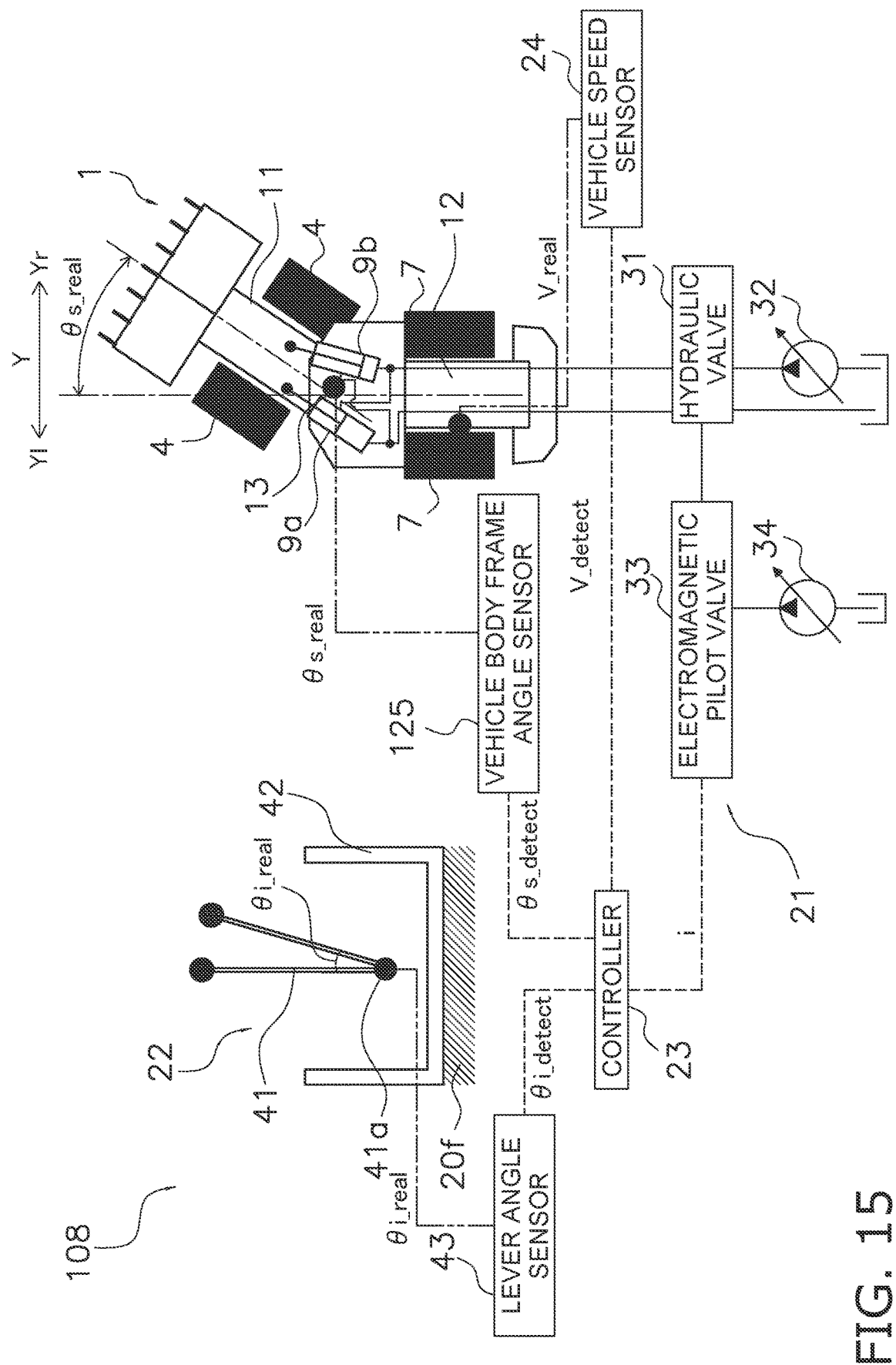
FIG. 15 is a block diagram showing a configuration of a valve system in a modified example of an embodiment according to the present disclosure.

In this case, as shown in the valve system 108 shown in FIG. 15, a vehicle body frame angle sensor 125 for detecting the steering angle $\theta$ s_real is provided. The steering angle $\theta$ s_detect detected by the vehicle body frame angle sensor 125 is input to the controller 23. The controller 23 calculates the deviation angle between the steering angle $\theta$ s_detect and the detection angle $\theta$ i_detect, and calculates the target flow rate based on the deviation angle.

As a result, in the position control in which the operating angle of the joystick lever 41 corresponds to the steering angle of the work machine, it is possible to suppress the vibration of the vehicle body during the reversal operation and realize the operation of the work machine according to the operator's intention.

Further, the neutral position P1 of the joystick lever 41 is a position where the deviation is zero. Since the neutral position P1 is determined in this way, the neutral position P1 of the operating member is not a specific position and changes according to the steering angle in the position control.

(B)

In the above embodiment, it is judged whether or not the reversal operation is performed based on the target flow rate Ft and the command flow rate Fc' one step before, but the present invention is not limited to this, and for example, it may be judged whether or not the reversal operation is performed based on the operating angle of the joystick lever 41 and the steering angle.

(C)

In the above embodiment, the controller 23 uses the command flow rate Fc' one step before, but is not limited to one step before.

(D)

In the above embodiment, it is configured that the supply amount of hydraulic fluid supplied from the hydraulic valve 31 to the steering cylinders 9a and 9b is controlled according to the pilot pressure input from the electromagnetic pilot valve 33. However, it may be configured that the hydraulic fluid from the electromagnetic pilot valve 33 is directly supplied to the steering cylinders 9a and 9b without going through the hydraulic valve 31. That is, an electromagnetic main valve may be used instead of the electromagnetic pilot valve 33.

(E)

In the above embodiment, only the joystick lever 41 has been described, but a steering wheel may be provided. A signal due to the rotation of the steering wheel is input to the controller 23, and the electromagnetic pilot valve 33 is operated based on the rotation.

(F)

The wheel loader 1 of the above embodiment may be operated by an operator on board, or may be operated unattended.

(G)

In the above embodiment, the method for controlling the electromagnetic pilot valve 33 has been described with reference to the flowchart shown in FIG. 12, but the present invention is not limited thereto.

For example, the present invention may be realized as a program that causes a computer to execute a method for controlling the electromagnetic pilot valve 33 that is performed out according to the flowchart shown in FIG. 12.

Further, one utility mode of the program may be a mode in which the program is recorded on a recording medium such as a ROM that can be read by a computer and operates in cooperation with the computer.

Further, one utility mode of the program may be a mode in which the program is propagated through a transmission medium such as the Internet or a transmission medium such as optical, radio wave, or sound wave, is computer readable, and is operated in conjunction with a computer.

Further, the above-mentioned computer is not limited to hardware such as a CPU (Central Processing Unit), and may include firmware, an OS, and peripheral devices.

As described above, the method for controlling the electromagnetic pilot valve 33 may be realized by software or hardware.

The valve system of the present invention has an effect of enabling control according to an operation command while suppressing vibration during reversal operation, and is useful for a wheel loader or the like which is an example of a work machine.

The invention claimed is:

1. A valve system comprising:
   a valve configured to adjust a flow rate of hydraulic fluid in order to steer a work machine; and
   a control section configured to determine a command signal sent to the valve, the command signal determining a command flow rate of the hydraulic fluid based on
   a target flow rate corresponding to an input operation command and
   a change amount in the target flow rate,
   the control section being configured to control a change amount in the command flow rate according to a magnitude of a reversal operation command when receiving the reversal operation command in order to operate the work machine in a direction opposite to a direction in which steering is operating.

2. The valve system according to claim 1, wherein
   the control section is configured to increase the change amount in the command flow rate when the magnitude of the reversal operation command is large.

3. The valve system according to claim 1, wherein
   the control section is configured to
   determine the command signal based on a limit value of the change amount in the command flow rate and the target flow rate, and
   change the limit value according to a difference between the target flow rate and a first predetermined threshold value when receiving the reversal operation command.

4. The valve system according to claim 3, wherein
   the control section is configured to stop changing the limit value and return to a preset limit value of the change amount in the command flow rate, when the command flow rate reaches a second predetermined threshold value.

5. The valve system according to claim 3, further comprising:
   an operating member configured to input the target flow rate, the first predetermined threshold value being input in a neutral position of the operating member.

6. The valve system according to claim 4, further comprising:
an operating member configured to input the target flow rate,
the second predetermined threshold value being input in a neutral position of the operating member.

7. The valve system according to claim 3, wherein
the control section is configured to change the limit value so that the larger the difference between the target flow rate and the first predetermined threshold value, the larger the limit value.

8. The valve system according to claim 3, wherein
the limit value is different when the flow rate decreases and when the flow rate increases.

9. The valve system according to claim 1, further comprising:
an operating member configured to input the target flow rate,
the control section being configured to obtain the target flow rate based on a deviation between
an operating angle of the operating member and
a steering angle of the work machine.

10. The valve system according to claim 9, wherein
a neutral position of the operating member is a position where the deviation is zero.

11. The valve system according to claim 1, further comprising:
an operating member configured to input the target flow rate,
the control section being configured to obtain the target flow rate based on an angle from a center position of the operating member.

12. The valve system according to claim 11, wherein
a neutral position of the operating member is the central position.

13. A work machine including the valve system according to claim 1, the work machine further comprising:
a front frame;
a rear frame;
an articulate mechanism rotatably connecting the front frame to the rear frame; and
a hydraulic actuator configured to be operated with hydraulic fluid supplied from the valve system, the hydraulic actuator being configured to drive the articulate mechanism.

14. A method of controlling a valve adjusting a flow rate of hydraulic fluid in order to steer a work machine, the method comprising:
determining a command signal sent to a valve, the command signal determining a command flow rate of the hydraulic fluid based on
a target flow rate corresponding to an input operation command and
a change amount in the target flow rate;
transmitting the command signal to the valve; and
controlling a change amount in the command flow rate according to a magnitude of a reversal operation command when receiving the reversal operation command in order to operate the work machine in a direction opposite to a direction in which steering is operating.

15. A non-transitory recording medium encoded with a program and being readable by a computer, the program being configured to cause a computer execute a plurality of steps in a method of controlling a valve adjusting a flow rate of hydraulic fluid in order to steer a work machine, the steps of the program comprising:
a determination step of determining a command signal sent to a valve, the command signal determining a command flow rate of the hydraulic fluid based on a target flow rate corresponding to an input operation command and a change amount in the target flow rate;
a transmission step of transmitting the command signal to the valve; and
a control step of controlling a change amount in the command flow rate according to a magnitude of a reversal operation command when receiving the reversal operation command in order to operate the work machine in a direction opposite to a direction in which steering is operating.

* * * * *